US010299259B2

(12) United States Patent
Wakabayashi et al.

(10) Patent No.: US 10,299,259 B2
(45) Date of Patent: May 21, 2019

(54) INTERCELL INTERFERENCE COORDINATION ACCOUNTING FOR MACHINE TYPE COMMUNICATION

(71) Applicant: SONY CORPORATION, Tokyo (JP)

(72) Inventors: Hideji Wakabayashi, Basingstoke (GB); Yuichi Morioka, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 74 days.

(21) Appl. No.: 14/650,991

(22) PCT Filed: Jan. 13, 2014

(86) PCT No.: PCT/GB2014/050077
§ 371 (c)(1),
(2) Date: Jun. 10, 2015

(87) PCT Pub. No.: WO2014/111693
PCT Pub. Date: Jul. 24, 2014

(65) Prior Publication Data
US 2015/0341911 A1   Nov. 26, 2015

(30) Foreign Application Priority Data

Jan. 16, 2013 (GB) .................................. 1300770.3

(51) Int. Cl.
*H04W 72/04* (2009.01)
*H04W 28/20* (2009.01)
(Continued)

(52) U.S. Cl.
CPC ....... *H04W 72/042* (2013.01); *H04J 11/0053* (2013.01); *H04L 5/0035* (2013.01);
(Continued)

(58) Field of Classification Search
CPC .. H04J 11/0053; H04L 5/0035; H04L 5/0073; H04L 27/2601; H04L 5/0064;
(Continued)

(56) References Cited

U.S. PATENT DOCUMENTS 6,041,124 A    3/2000  Sugita
9,332,505 B2 * 5/2016  Siomina
(Continued)

FOREIGN PATENT DOCUMENTS

AU    A-75437/96    6/1997
CN    101795471 A   8/2010
(Continued)

OTHER PUBLICATIONS

U.S. Appl. No. 14/649,680, filed Jun. 4, 2015, Wakabayashi, et al.
(Continued)

*Primary Examiner* — Peter P Chau
(74) *Attorney, Agent, or Firm* — Xsensus, LLP

(57) ABSTRACT

A method of operating a base station in a wireless telecommunications system. Downlink communications from the base station to terminal devices are made using a plurality of OFDM sub-carriers spanning a system frequency bandwidth. The base station supports communications with a first type of terminal device on a host carrier using OFDM sub-carriers distributed across the system frequency bandwidth and supports communications with a second type of terminal device on a restricted bandwidth carrier using OFDM sub-carriers distributed across a restricted frequency bandwidth which is smaller than and within the system frequency bandwidth. Respective base stations can exchange information regarding their restricted bandwidth carrier transmissions to help them coordinate their respective transmissions with a view to reducing intercell interference.

15 Claims, 19 Drawing Sheets

(51) Int. Cl.
*H04L 27/26* (2006.01)
*H04J 11/00* (2006.01)
*H04L 5/00* (2006.01)
*H04W 88/08* (2009.01)

(52) U.S. Cl.
CPC .......... *H04L 5/0064* (2013.01); *H04L 5/0073* (2013.01); *H04L 5/0087* (2013.01); *H04L 27/2601* (2013.01); *H04W 28/20* (2013.01); *H04W 72/0453* (2013.01); *H04L 5/0007* (2013.01); *H04L 5/0039* (2013.01); *H04W 88/08* (2013.01)

(58) Field of Classification Search
CPC ... H04L 5/0087; H04L 5/0007; H04L 5/0039; H04W 72/042; H04W 72/0453; H04W 28/20; H04W 88/08
See application file for complete search history.

(56) References Cited

U.S. PATENT DOCUMENTS

| | | | |
|---|---|---|---|
| 2005/0277429 A1* | 12/2005 | Laroia | H04W 68/025 455/458 |
| 2008/0247375 A1 | 10/2008 | Muharemovic et al. | |
| 2009/0181701 A1* | 7/2009 | Willey | H04W 68/025 455/458 |
| 2012/0122495 A1* | 5/2012 | Weng | H04W 68/025 455/458 |
| 2012/0165029 A1 | 6/2012 | Lindbom et al. | |
| 2013/0114517 A1* | 5/2013 | Blankenship | H04L 5/0053 370/329 |
| 2014/0031063 A1 | 1/2014 | Park et al. | |
| 2015/0195774 A1* | 7/2015 | Lee | H04W 72/1226 370/312 |
| 2015/0249952 A1* | 9/2015 | Lee | H04W 4/06 370/312 |

FOREIGN PATENT DOCUMENTS

| | | |
|---|---|---|
| EP | 2 339 876 A1 | 6/2011 |
| EP | 2 747 477 A1 | 6/2014 |
| GB | 2487757 A | 8/2012 |
| GB | 2487780 A | 8/2012 |
| GB | 2487782 A | 8/2012 |
| GB | 2487906 A | 8/2012 |
| GB | 2487907 A | 8/2012 |
| GB | 2487908 A | 8/2012 |
| GB | 2487909 A | 8/2012 |
| GB | 2488513 A | 9/2012 |
| GB | 2497742 A | 6/2013 |
| GB | 2497743 A | 6/2013 |
| JP | 9-172685 | 6/1997 |
| WO | WO 2009/007722 A1 | 1/2009 |
| WO | WO 2011/119750 A1 | 9/2011 |
| WO | WO 2012/104629 A2 | 8/2012 |
| WO | WO 2012/104630 A1 | 8/2012 |
| WO | WO 2012/104631 A1 | 8/2012 |
| WO | WO 2012/104633 A1 | 8/2012 |
| WO | WO 2012/104634 A1 | 8/2012 |
| WO | WO 2012/104635 A1 | 8/2012 |
| WO | WO 2012/129556 A1 | 9/2012 |
| WO | WO 2012/138148 A2 | 10/2012 |
| WO | WO 2012/172323 A1 | 12/2012 |
| WO | WO 2013/066877 A1 | 5/2013 |

OTHER PUBLICATIONS

U.S. Appl. No. 14/650,931, filed Jun. 10, 2015, Wakabayashi, et al.
Search Report dated Jul. 10, 2013 in United Kingdom Patent Application No. GB 1300770.3.
International Search Report dated Apr. 17, 2014 in PCT/GB2014/050077.
General Dynamics Broadband UK "Coverage Extension for MTC UEs", 3GPP TSG-RAN 1#71, Nov. 12-16, 2012, R1-125204, XP50663062A, 7 pages.
Xincheng Zhang, et al., "LTE Advanced Air Interface Technology", XP55104344A, Collaborative Multipoint, Sep. 5, 2012, 42 pages.
ETSI TS 122 368 V10.5.0, (Jul. 2011), Digital cellular telecommunications system (Phase 2+); Universal Mobile Telecommunications System (UMTS); LTE;Service requirements for Machine-Type Communications (MTC); Stage 1 (3GPP TS 22.368 version 10.5.0 Release 10), 18 pages.
Harri Holma, et al., , "LTE for UMTS OFDMA and SC-FDMA based radio access", System Architecture Based on 3GPP SAE, 2009, 4 pages.
Volker Pauli, et al., Nomor Research GmbH—"Heterogeneous LTE Networks and Inter-cell Interference Coordination", novel mobile radio (Nomor) research, 2010, 9 pages http://www.nomor.de/uploads/a4/81/a4815c4dc585be33c81f0ec7a15deed7/2010-12-WhitePaper_LTE_HetNet_ICIC.pdf.
Chao Xiong, ZTE Corporation—"Enhanced ICIC for LTE-A HetNet", ZTE Technologies, 2012, 4 pages http://wwwen.zte.com.cn/endata/magazine/ztetechnologies/2012/no1/articles/201202/t20120206_283266.html.
ETSI TS 136 420 V11.0.0 (Oct. 2012), 3GPP TS 36.420 version 11.0.0 (Release 11), LTE; Evolved Universal Terrestrial Radio Access Network (E-UTRAN); X2 general aspects and principles (3GPP TS 36.420 version 11.0.0 Release 11), 15 pages.
3GPP TS 36.423 V11.2.0 (Release 11), (Oct. 2012), ETSI TS 136 423 V11.2.0 (Oct. 2012), LTE; Access Network (E-UTRAN); X2 Application Protocol (X2AP), 139 pages.
Japanese Office Action dated Aug. 1, 2017 in Patent Application No. 2015-553156 (with Partial English Translation).
Nokia Siemens Networks, Nokia, "Coverage Improvement for MTC UEs", 3GPP TSG RAN #71, R1-125018, Nov. 2, 2012, 3 pages.
Combined Chinese Office Action and Search Report dated Jun. 19, 2017 in Patent Application No. 201480005096.9 (with English Translation).
Office Action dated Feb. 20, 2018 in European Patent Application No. 14 700 124.2, 7 pages.
Office Action dated Mar. 13, 2018 in Japanese Patent Application No. 2015-553156, with English-language Translation, 10 pages.
Office Action dated Oct. 9, 2017 in Chinese Patent Application No. 201480005096.9 (with English-language Translation).
Office Action dated Jan. 2, 2018 in United Kingdom Patent Application No. GB1300770.3, 5 pages.

* cited by examiner

Background

Background

Background

Background

INTERCELL INTERFERENCE COORDINATION ACCOUNTING FOR MACHINE TYPE COMMUNICATION

CROSS-REFERENCE TO RELATED APPLICATIONS

The present application is based on PCT application PCT/GB2014/050077 filed Jan. 13, 2014, and claims priority to British Patent Application 1300770.3, filed in the UK IPO on 16 Jan. 2013, the entire contents of each of which being incorporated herein by reference.

BACKGROUND OF THE INVENTION

The present invention relates to methods and apparatus for use in wireless (mobile) telecommunications systems. In particular, embodiments of the invention relate to interference considerations in telecommunications systems.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server relating to the customers consumption of a utility such as gas, water, electricity and so on. Further information on characteristics of MTC-type devices can be found, for example, in the corresponding standards, such as ETSI TS 122 368 V10.530 (2011-07)/3GPP TS 22.368 version 10.5.0 Release 10) [1]. Some typical characteristics of MTC type terminal devices/MTC type data might include, for example, characteristics such as low mobility, high delay tolerance, small data transmissions, infrequent transmission and group-based features, policing and addressing.

Whilst it can be convenient for a terminal such as an MTC type terminal to take advantage of the wide coverage area provided by a third or fourth generation mobile telecommunication network there are at present disadvantages. Unlike a conventional third or fourth generation terminal device such as a smartphone, an MTC-type terminal is preferably relatively simple and inexpensive and able to operate on relatively low resources (e.g. low power consumption). The type of functions performed by the MTC-type terminal (e.g. collecting and reporting back data) do not require particularly complex processing to perform, and furthermore are typically not time-critical. However, third and fourth generation mobile telecommunication networks typically employ advanced data modulation techniques on the radio interface which can be power hungry and require more complex and expensive radio transceivers to implement. It is usually justified to include such complex transceivers in a smartphone as a smartphone will typically require a powerful processor to perform typical smartphone type functions. However, as indicated above, there is now a desire to use relatively inexpensive and less complex devices able to operate with low resource usage to communicate using LTE type networks. To this end, so-called "virtual carriers" have been proposed and some characteristics of these are discussed further below.

The increasingly widespread deployment of wireless telecommunications systems can give rise to more likelihood of interference between neighbouring cells. This is particularly the case for LTE based systems which generally adopt a unit frequency reuse approach in which neighbouring cells employ the same radio frequencies. This means a terminal device at a boundary between two communication cells can be receiving comparable signal levels from different base stations using the same frequency resources, thereby leading to potentially significant interference. There have been proposals to address such intercell interference in LTE-type networks using what are generally referred to as Intercell Interference Coordination (ICIC) techniques.

One ICIC technique is the so-called soft frequency reuse approach. In accordance with this technique a base station allocates resources to different terminal devices using different frequencies depending on the respective terminal devices' geographic locations. In particular, neighbouring base stations coordinate so that at geographic locations in the vicinity of boundaries between two communication cells (coverage areas) associated with two base stations, one of the base stations communicates with its connected terminal devices in one frequency band, whilst the other base station communicates with its connected terminal devices in a different frequency band. Thus, in accordance with this approach, a terminal device near a boundary between two cells and connected to a first base station is less prone to interference from a neighbouring base station because the neighbouring base station will be using a different frequency band to serve its connected terminal devices in the vicinity of the cell boundary at that location. Each base station may communicate with terminal devices away from cell boundaries (e.g. at cell centre) using all frequencies, with such transmissions typically being made at a lower power than for transmissions associated with terminal devices in the vicinity of the cell edge.

Another ICIC technique has been proposed for telecommunications networks including a macro base station serving an area that includes one or more femto- or pico-cells (served by respective femto- or pico-base stations). This technique uses so-called Almost Blank Subframes. In accordance with this approach, the base station will select subframes in which it will make almost no transmissions (for example retaining only cell reference signals) and will communicate the timings of these "almost blank subframes" to network elements supporting communications in the femto- or pico-cells. Communications within the femto-/pico-cells can then be coordinated to occur during the subframes in which the macro base station is transmitting an almost blank subframe, thereby reducing the potential for the macro base station to interfere with communications in the femto-/pico-cells.

More details on ICIC techniques, such as those described above, can be found in a paper published by Nomor Research GmbH—"Heterogeneous LTE Networks and Intercell Interference Coordination" by Pauli et al. and also from an article published by ZTE Corporation—"Enhanced ICIC for LTE-A HetNet" by Xiong. Details regarding the protocols for coordinating communications between base stations, for example on the X2 interface of an LTE network, can be found in the relevant standards, for example in ETSI TS 136 420 V11.0.0 (2012-10)/3GPP TS 36.420 version 11.0.0 (Release 11) [15] and 3GPP TS 36.423 version 11.2.0 (Release 11) [16].

The present inventors have recognised how the proposed introduction of virtual carriers in wireless telecommunications systems may give rise to additional intercell interference considerations that should be addressed to optimise communications in such systems. For example, it is frequently proposed that virtual carriers may be particularly useful for supporting machine type communication devices and the inventors have recognised that such devices may frequently be located in areas of relatively poor network coverage, i.e. they may be "hard to reach" devices. For example, smart-meter type MTC devices might often be located in a basement or other location with relatively high penetration loss. This can mean high transmission powers may often be required to support reliable communications on virtual carriers, thereby giving rise to additional intercell interference concerns.

There is therefore a desire to provide wireless telecommunications apparatus and methods which are able to further help support communications with terminal devices with reduced intercell interference.

SUMMARY OF THE INVENTION

According to a first aspect of the invention there is provided a method of operating a base station in a wireless telecommunications system in which downlink communications from the base station to terminal devices are made using a plurality of Orthogonal Frequency Division Multiplex, OFDM, sub-carriers spanning a system frequency bandwidth, and wherein the base station supports communications with a first type of terminal device on a host carrier using OFDM sub-carriers distributed across the system frequency bandwidth and supports communications with a second type of terminal device on a restricted bandwidth carrier using OFDM sub-carriers distributed across a restricted frequency bandwidth, wherein the restricted frequency bandwidth is smaller than and within the system frequency bandwidth, and wherein the method comprises: selecting a transmission characteristic for transmissions to be made by the base station to the second type of terminal device using the restricted bandwidth carrier; and conveying an indication of the transmission characteristic from the base station to at least one other base station of the wireless telecommunications system.

In accordance with some embodiments the transmission characteristic comprises frequency and/or time resources on which transmissions are to be made by the base station to the second type of terminal device using the restricted bandwidth carrier.

In accordance with some embodiments the indication of the transmission characteristic comprises an identifier for a range of frequencies for the restricted bandwidth carrier selected from a set of potential ranges of frequencies for restricted bandwidth carriers that the base station is able to support.

In accordance with some embodiments the indication of the transmission characteristic comprises an indication of physical resource blocks to be used by the base station for transmitting the restricted bandwidth carrier.

In accordance with some embodiments the indication of the transmission characteristic comprises an indication that transmissions are to be made by the base station to the second type of terminal device using the restricted bandwidth carrier with a maximum transmission power threshold which is greater than a maximum transmission power threshold for contemporaneous transmissions to be made by the base station to the first type of terminal device using the host carrier.

In accordance with some embodiments the wireless telecommunications system uses a radio frame structure comprising subframes, and wherein the indication of the transmission characteristic comprises an indication of one or more subframes to be used by the base station for transmissions to the second type of terminal device using the restricted bandwidth carrier.

In accordance with some embodiments the method further comprises receiving from a further base station of the wireless telecommunications system an indication of a transmission characteristic to be used by the further base station for transmissions to the second type of terminal device using a reduced bandwidth carrier, and taking account of the indication of the transmission characteristic received from the further base station when selecting the transmission characteristic for transmissions to be made by the base station using the restricted bandwidth carrier.

In accordance with some embodiments the indication of a transmission characteristic received from the further base station comprises an indication of frequency and/or time resources on which transmissions are to be made by the further base station to the second type of terminal device using a restricted bandwidth carrier associated with the further base station, and wherein the step of selecting a transmission characteristic for transmissions to be made by the base station to the second type of terminal device using the restricted bandwidth carrier comprises selecting frequency and/or time resources to be used for the restricted bandwidth carrier which are different from the frequency and/or time resources comprising the indication of a transmission characteristic received from the further base station.

In accordance with some embodiments the further base station from which an indication of frequency and/or time resources on which transmissions are to be made by the further base station is received is one of the at least one other base station to which the base station conveys its own indication of a transmission characteristic.

In accordance with some embodiments the indication of the transmission characteristic is conveyed from the base station to the at least one other base station of the wireless telecommunications system over a point-to-point logical interface between the base station and respective ones of the at least one other base station.

In accordance with some embodiments the indication of the transmission characteristic is conveyed from the base station to the at least one other base station of the wireless telecommunications system over an X2 interface of the wireless telecommunications system.

In accordance with some embodiments the indication of the transmission characteristic is conveyed to the at least one other base station in an information element defined for the X2 interface.

In accordance with some embodiments the method further comprises making transmissions to the second type of terminal device in accordance with the selected transmission characteristic using the restricted bandwidth carrier with a maximum transmission power threshold which is greater than a maximum transmission power threshold for contemporaneous transmissions made by the base station to the first type of terminal device using the host carrier.

In accordance with some embodiments the method further comprises making transmissions to the second type of terminal device in accordance with the selected transmission characteristic using the restricted bandwidth carrier with a transmission power which is greater than a maximum transmission power threshold for contemporaneous transmissions made by the base station to the first type of terminal device using the host carrier.

In accordance with some embodiments the first type of terminal device and the second type of terminal device are types of terminal device having different operating capabilities.

According to another aspect of the invention there is provided a base station in a wireless telecommunications system in which downlink communications from the base station to terminal devices are made using a plurality of Orthogonal Frequency Division Multiplex, OFDM, sub-carriers spanning a system frequency bandwidth, and wherein the base station supports communications with a first type of terminal device on a host carrier using OFDM sub-carriers distributed across the system frequency bandwidth and supports communications with a second type of terminal device on a restricted bandwidth carrier using OFDM sub-carriers distributed across a restricted frequency bandwidth, wherein the restricted frequency bandwidth is smaller than and within the system frequency bandwidth, and wherein the method comprises: wherein the base station is configured to select a transmission characteristic for transmissions to be made by the base station to the second type of terminal device using the restricted bandwidth carrier and convey an indication of the transmission characteristic to at least one other base station of the wireless telecommunications system.

According to another aspect of the invention there is provided a method of operating a base station in a wireless telecommunications system in which downlink communications from the base station to terminal devices are made using a plurality of Orthogonal Frequency Division Multiplex, OFDM, sub-carriers spanning a system frequency bandwidth, and wherein the base station supports communications with a first type of terminal device on a host carrier using OFDM sub-carriers distributed across the system frequency bandwidth and supports communications with a second type of terminal device on a restricted bandwidth carrier using OFDM sub-carriers distributed across a restricted frequency bandwidth, wherein the restricted frequency bandwidth is smaller than and within the system frequency bandwidth, and wherein the method comprises: receiving from a further base station of the wireless telecommunications system an indication of a transmission characteristic to be used by the further base station for transmissions to the second type of terminal device using a reduced bandwidth carrier associated with the further base station; and selecting a transmission characteristic for transmissions to be made by the base station to the second type of terminal device using the restricted bandwidth carrier in a manner that takes account of the indication of the transmission characteristic received from the further base station.

In accordance with some embodiments the transmission characteristic associated with the indication received from the further base station comprises frequency and/or time resources on which transmissions are to be made by the further base station to the second type of terminal device using a restricted bandwidth carrier.

In accordance with some embodiments the transmission characteristic associated with the indication received from the further base station comprises an identifier for a range of frequencies for the restricted bandwidth carrier selected from a set of potential ranges of frequencies for restricted bandwidth carriers that are supported in the wireless telecommunications system.

In accordance with some embodiments the transmission characteristic associated with the indication received from the further base station comprises an indication of physical resource blocks to be used by the further base station for transmitting a restricted bandwidth carrier.

In accordance with some embodiments the wireless telecommunications system uses a radio frame structure comprising subframes, and wherein the indication of the transmission characteristic received from the further base station comprises an indication of one or more subframes to be used by the further base station for transmissions to the second type of terminal device using a restricted bandwidth carrier.

In accordance with some embodiments the indication received from the further base station comprises an indication that transmissions are to be made by the further base station to the second type of terminal device using a restricted bandwidth carrier with a maximum transmission power threshold which is greater than a maximum transmission power threshold for contemporaneous transmissions to be made by the further base station to the first type of terminal device.

In accordance with some embodiments the transmission characteristic selected by the base station for transmissions to be made to the second type of terminal device using the restricted bandwidth carrier comprises frequency and/or time resources on which the transmissions are to be made by the base station to the second type of terminal device using the restricted bandwidth carrier.

In accordance with some embodiments the indication of a transmission characteristic received from the further base station comprises an indication of frequency and/or time resources on which transmissions are to be made by the further base station to the second type of terminal device using a restricted bandwidth carrier associated with the further base station, and wherein the step of selecting a transmission characteristic for transmissions to be made by the base station to the second type of terminal device using the restricted bandwidth carrier comprises selecting frequency and/or time resources to be used for the restricted bandwidth carrier which are different from the frequency and/or time resources comprising the indication of a transmission characteristic received from the further base station.

In accordance with some embodiments the method further comprises conveying an indication of the transmission characteristic selected by the base station for transmissions to be made by the base station to the second type of terminal device using the restricted bandwidth carrier to at least one other base station of the wireless telecommunications system.

In accordance with some embodiments the further base station from which an indication of frequency and/or time resources on which transmissions are to be made by the further base station is received is one of the at least one other base station to which the base station conveys an indication of the selected transmission characteristic.

In accordance with some embodiments the method further comprises making transmissions to the second type of terminal device in accordance with the selected transmission characteristic using the restricted bandwidth carrier with a maximum transmission power threshold which is greater than a maximum transmission power threshold for contemporaneous transmissions made by the base station to the first type of terminal device using the host carrier.

In accordance with some embodiments the method further comprises making transmissions to the second type of terminal device in accordance with the selected transmission characteristic using the restricted bandwidth carrier with a transmission power which is greater than a maximum transmission power threshold for contemporaneous transmissions made by the base station to the first type of terminal device using the host carrier.

In accordance with some embodiments the indication of the transmission characteristic is received from the further base station over a point-to-point logical interface between the base station and the further base station.

In accordance with some embodiments the indication of the transmission characteristic is received from the further base station over an X2 interface of the wireless telecommunications system.

In accordance with some embodiments the indication of the transmission characteristic is received from the further base station in an information element defined for the X2 interface.

In accordance with some embodiments the first type of terminal device and the second type of terminal device are types of terminal device having different operating capabilities.

According to another aspect of the invention there is provided a base station in a wireless telecommunications system in which downlink communications from the base station to terminal devices are made using a plurality of Orthogonal Frequency Division Multiplex, OFDM, sub-carriers spanning a system frequency bandwidth, and wherein the base station supports communications with a first type of terminal device on a host carrier using OFDM sub-carriers distributed across the system frequency bandwidth and supports communications with a second type of terminal device on a restricted bandwidth carrier using OFDM sub-carriers distributed across a restricted frequency bandwidth, wherein the restricted frequency bandwidth is smaller than and within the system frequency bandwidth, and wherein the base station is configured to receive from a further base station of the wireless telecommunications system an indication of a transmission characteristic to be used by the further base station for transmissions to the second type of terminal device using a reduced bandwidth carrier associated with the further base station; and to select a transmission characteristic for transmissions to be made by the base station to the second type of terminal device using the restricted bandwidth carrier in a manner that takes account of the indication of the transmission characteristic received from the further base station.

It will be appreciated that features and aspects of the invention described above in relation to the first and other aspects of the invention are equally applicable to, and may be combined with, embodiments of the invention according to other aspects of the invention as appropriate, and not just in the specific combinations described above.

BRIEF DESCRIPTION OF DRAWINGS

Embodiments of the present invention will now be described by way of example only with reference to the accompanying drawings where like parts are provided with corresponding reference numerals and in which.

DESCRIPTION OF EXAMPLE EMBODIMENTS

Embodiments of the invention may in particular be employed within the context of what might be termed "virtual carriers" operating within a bandwidth of a "host carriers". The concepts of virtual carriers are described in co-pending UK patent applications numbered GB 1101970.0 [2], GB 1101981.7 [3], GB 1101966.8 [4], GB 1101983.3 [5], GB 1101853.8 [6], GB 1101982.5 [7], GB 1101980.9 [8], GB 1101972.6 [9], GB 1121767.6 [10] and GB 1121766.8 [11] the contents of which are incorporated herein by reference. The reader is referred to these co-pending applications for more details, but for ease of reference an overview of the concept of virtual carriers is also provided here.

Conventional Network

Figure 1:
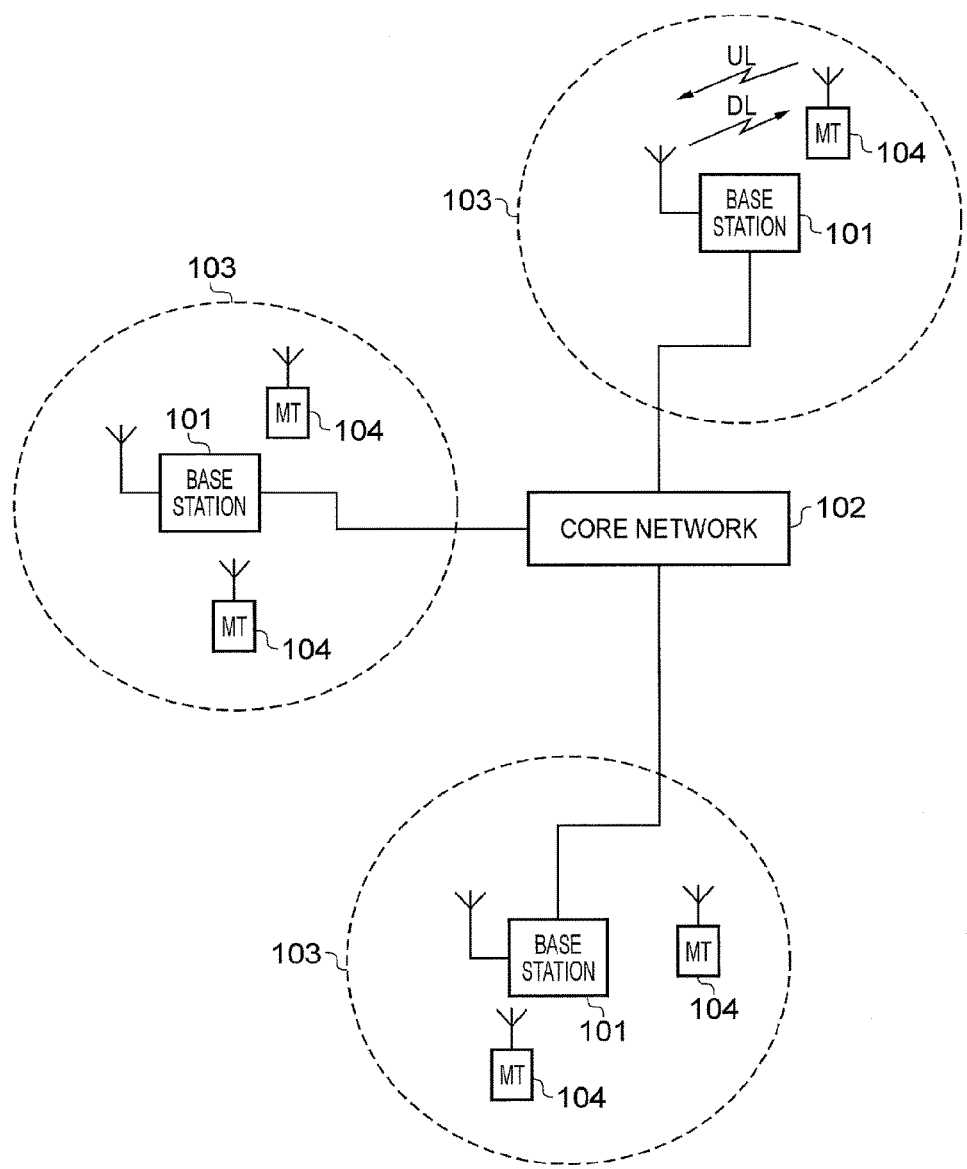
FIG. 1 provides a schematic diagram illustrating an example of a conventional mobile telecommunication network.

FIG. 1 provides a schematic diagram illustrating some basic functionality of a wireless telecommunications network/system 100 operating in accordance with LTE principles. Various elements of FIG. 1 and their respective modes of operation are well-known and defined in the relevant standards administered by the 3GPP® body and also described in many books on the subject, for example, Holma H. and Toskala A [12].

The network includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on.

Figure 2:
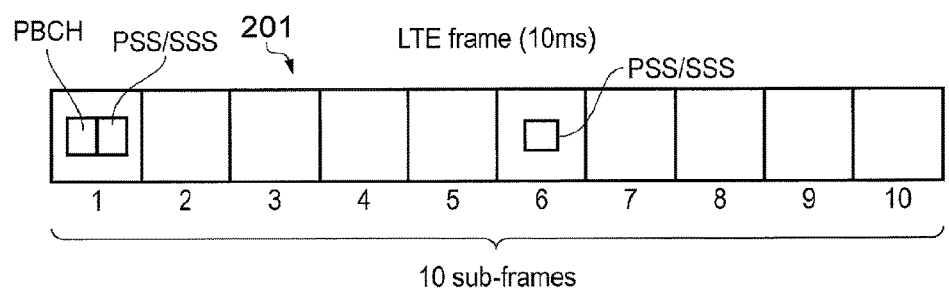
FIG. 2 provides a schematic diagram illustrating a conventional LTE radio frame.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA). FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A primary broadcast channel (PBCH) is transmitted in the first subframe of the LTE frame. The PSS, SSS and PBCH are discussed in more detail below.

Figure 3:
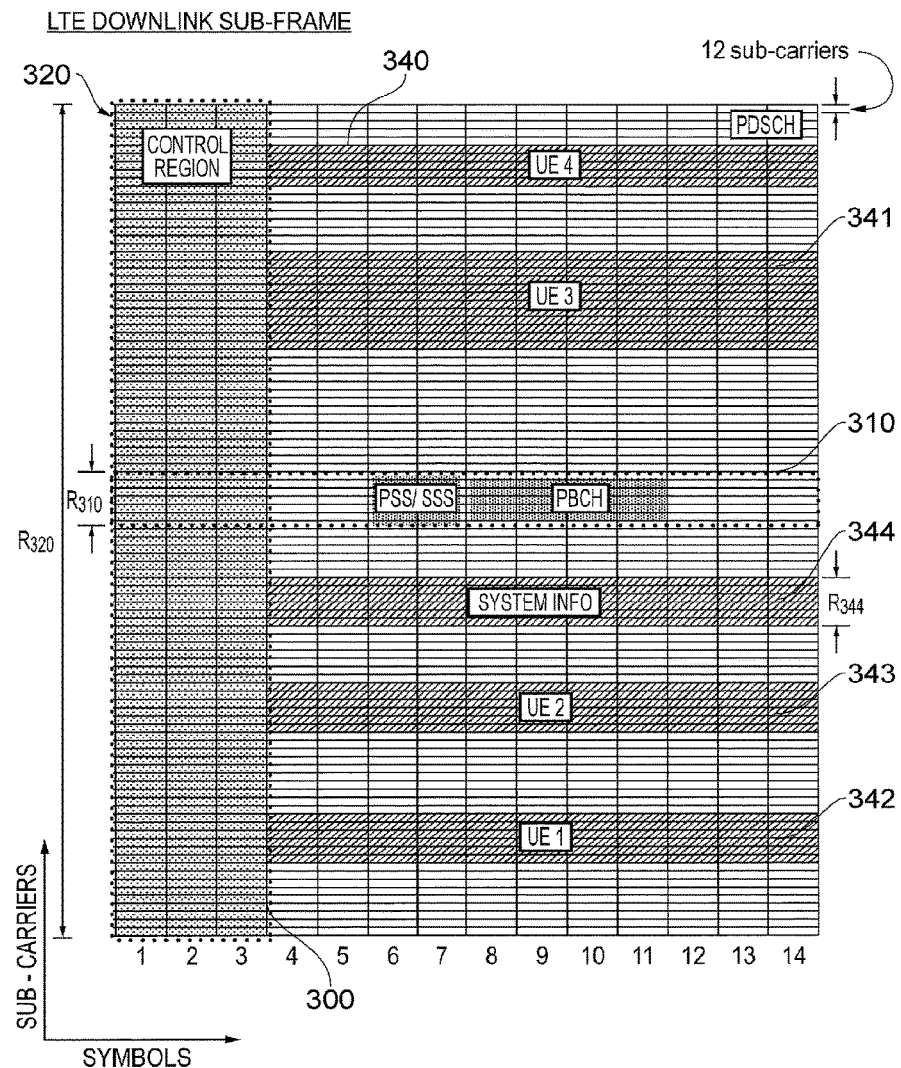
FIG. 3 provides a schematic diagram illustrating an example of a conventional LTE downlink radio subframe.

FIG. 3 is a schematic diagram of a grid which illustrates the structure of an example conventional downlink LTE subframe. The subframe comprises a predetermined number of symbols which are transmitted over a 1 ms period. Each symbol comprises a predetermined number of orthogonal sub-carriers distributed across the bandwidth of the downlink radio carrier. The example subframe shown in FIG. 3 comprises 14 symbols and 1200 sub-carriers spread across a 20 MHz bandwidth. The smallest allocation of user data for transmission in LTE is a resource block comprising twelve sub-carriers transmitted over one slot (0.5 subframe). For clarity, in FIG. 3, each individual resource element is not shown, instead each individual box in the subframe grid corresponds to twelve sub-carriers transmitted on one symbol.

FIG. 3 shows in hatching resource allocations for four LTE terminals 340, 341, 342, 343. For example, the resource allocation 342 for a first LTE terminal (UE 1) extends over five blocks of twelve sub-carriers (i.e. 60 sub-carriers), the resource allocation 343 for a second LTE terminal (UE2) extends over six blocks of twelve sub-carriers and so on.

Control channel data is transmitted in a control region 300 (indicated by dotted-shading in FIG. 3) of the subframe comprising the first n symbols of the subframe where n can vary between one and three symbols for channel bandwidths of 3 MHz or greater and where n can vary between two and four symbols for channel bandwidths of 1.4 MHz. For the sake of providing a concrete example, the following description relates to host carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers on which symbols of the subframe have been allocated to specific LTE terminals. Thus, the PDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE terminal device to achieve frame synchronisation and determine the cell identity of the enhanced Node B transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the subframe. Further explanation of these channels is provided below.

FIG. 3 also shows a region of PDSCH containing system information and extending over a bandwidth of $R_{344}$. A conventional LTE frame will also include reference signals which are discussed further below but not shown in FIG. 3 in the interests of clarity.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth (as schematically shown in FIG. 3). As is known in the art, data transmitted on the PDCCH, PCFICH and PHICH is typically distributed on the sub-carriers across the entire bandwidth of the subframe to provide for frequency diversity.

Therefore a conventional LTE terminal must be able to receive the entire channel bandwidth in order to receive and decode the control region.

Figure 4:
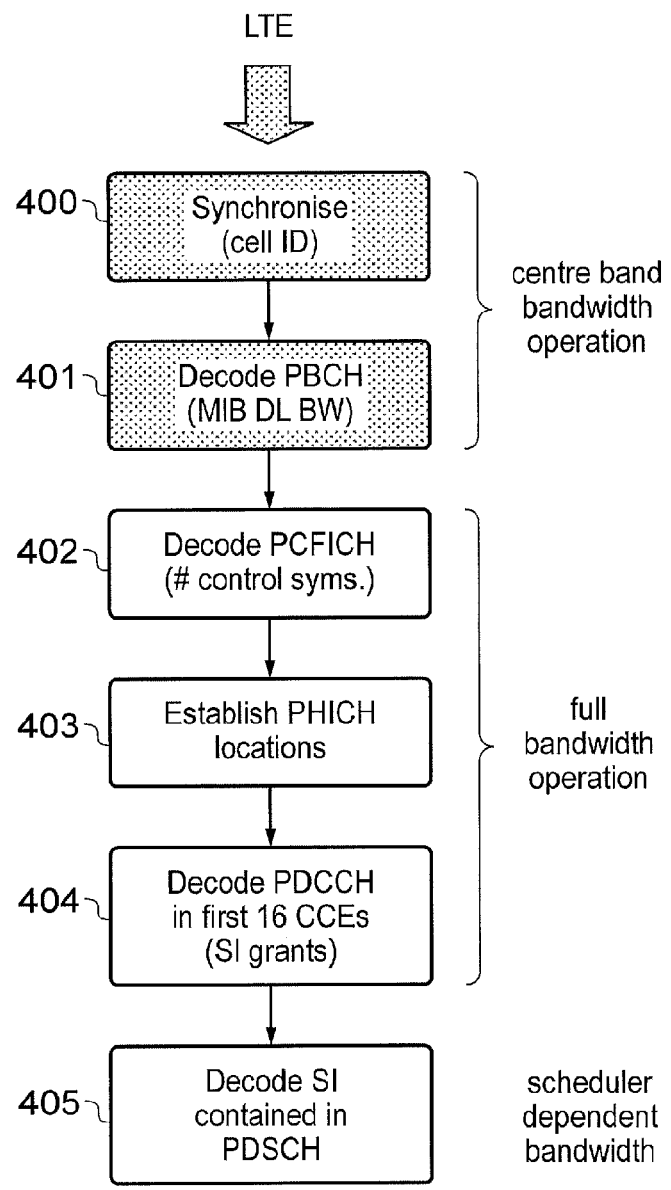
FIG. 4 provides a schematic diagram illustrating a conventional LTE "camp-on" procedure.

FIG. 4 illustrates an LTE "camp-on" process, that is, the process followed by a terminal so that it can decode downlink transmissions which are sent by a base station via a downlink channel. Using this process, the terminal can identify the parts of the transmissions that include system information for the cell and thus decode configuration information for the cell.

As can be seen in FIG. 4, in a conventional LTE camp-on procedure, the terminal first synchronizes with the base station (step 400) using the PSS and SSS in the centre band and then decodes the PBCH (step 401). Once the terminal has performed steps 400 and 401, it is synchronized with the base station.

For each subframe, the terminal then decodes the PCFICH which is distributed across the entire bandwidth of carrier 320 (step 402). As discussed above, an LTE downlink carrier can be up to 20 MHz wide (1200 sub-carriers) and an LTE terminal therefore has to have the capability to receive and decode transmissions on a 20 MHz bandwidth in order to decode the PCFICH. At the PCFICH decoding stage, with a 20 MHz carrier band, the terminal operates at a much larger bandwidth (bandwidth of $R_{320}$) than during steps 400 and 401 (bandwidth of $R_{310}$) relating to synchronization and PBCH decoding.

The terminal then ascertains the PHICH locations (step 403) and decodes the PDCCH (step 404), in particular for identifying system information transmissions and for identifying its resource allocations. The resource allocations are used by the terminal to locate system information and to locate its data in the PDSCH as well as to be informed of any transmission resources it has been granted on PUSCH. Both system information and UE-specific resource allocations are transmitted on PDSCH and scheduled within the carrier band 320. Steps 403 and 404 also require the terminal to operate on the entire bandwidth R320 of the carrier band.

At steps 402 to 404, the terminal decodes information contained in the control region 300 of a subframe. As explained above, in LTE, the three control channels mentioned above (PCFICH, PHICH and PDCCH) can be found across the control region 300 of the carrier where the control region extends over the range $R_{320}$ and occupies the first one, two or three OFDM symbols of each subframe as discussed above. In a subframe, typically the control channels do not use all the resource elements within the control region 300, but they are scattered across the entire region, such that a LTE terminal has to be able to simultaneously receive the entire control region 300 for decoding each of the three control channels.

The terminal can then decode the PDSCH (step 405) which contains system information or data transmitted for this terminal.

As explained above, in an LTE subframe the PDSCH generally occupies groups of resource elements which are neither in the control region nor in the resource elements occupied by PSS, SSS or PBCH. The data in the blocks of resource elements 340, 341, 342, 343 allocated to the different mobile communication terminals (UEs) shown in FIG. 3 have a smaller bandwidth than the bandwidth of the entire carrier, although to decode these blocks a terminal first receives the PDCCH spread across the frequency range $R_{320}$ to determine if the PDCCH indicates that a PDSCH resource is allocated to the UE and should be decoded. Once a UE has received the entire subframe, it can then decode the PDSCH in the relevant frequency range (if any) indicated by the PDCCH. So for example, UE 1 discussed above decodes the whole control region 300 and then the data in the resource block 342.

Virtual Downlink Carrier

Certain classes of devices, such as MTC devices (e.g. semi-autonomous or autonomous wireless communication devices such as smart meters as discussed above), support communication applications that are characterised by the transmission of small amounts of data at relatively infrequent intervals and can thus be considerably less complex than conventional LTE terminals. In many scenarios, providing low capability terminals such as those with a conventional high-performance LTE receiver unit capable of receiving and processing data from an LTE downlink frame across the full carrier bandwidth can be overly complex for a device which only needs to communicate small amounts of data. This may therefore limit the practicality of a widespread deployment of low capability MTC type devices in an LTE network. It is preferable instead to provide low capability terminals such as MTC devices with a simpler receiver unit which is more proportionate with the amount of data likely to be transmitted to the terminal. As set out below, in accordance with examples of the present invention a "virtual carrier" is provided within the transmission resources of a conventional OFDM type downlink carrier (i.e. a "host carrier"). Unlike data transmitted on a conventional OFDM type downlink carrier, data transmitted on the virtual carrier can be received and decoded without needing to process the full bandwidth of the downlink host OFDM carrier. Accordingly, data transmitted on the virtual carrier can be received and decoded using a reduced complexity receiver unit.

Figure 5:
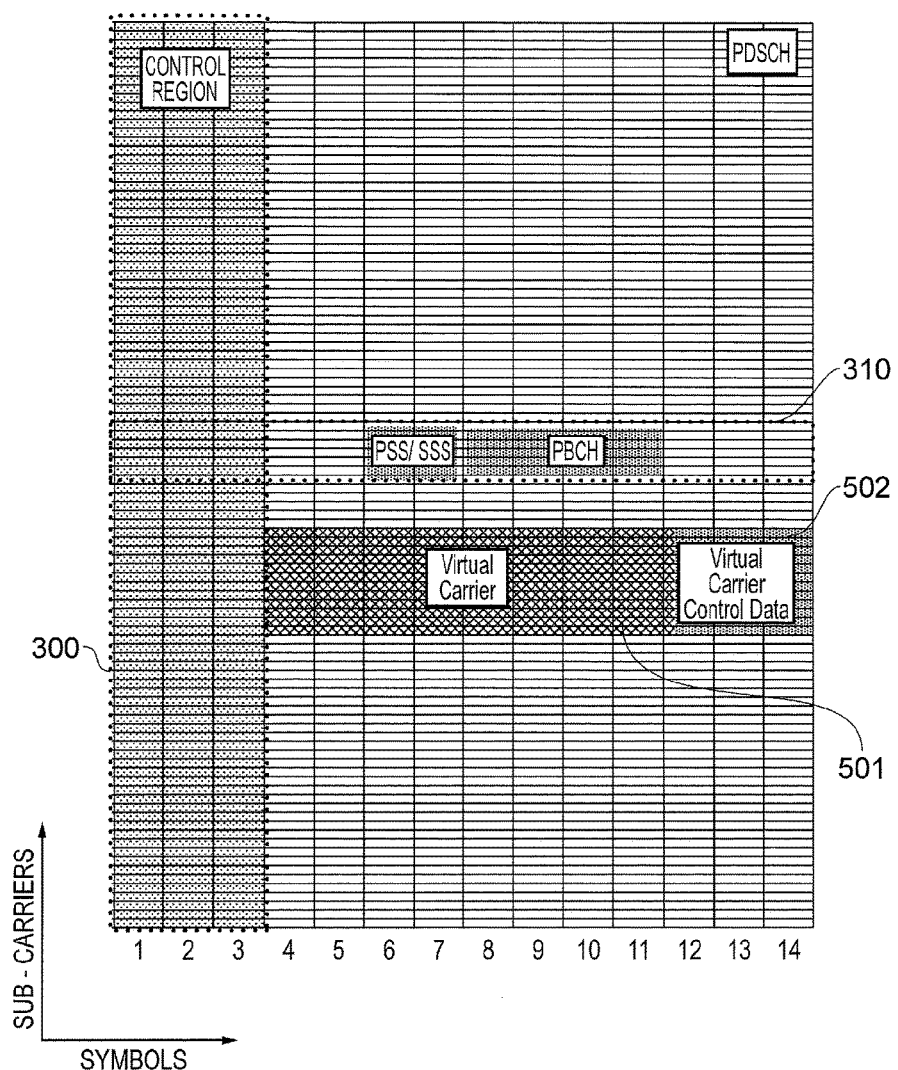
FIG. 5 provides a schematic diagram illustrating an LTE downlink radio subframe in which a virtual carrier has been inserted in accordance with an embodiment of the invention.

FIG. 5 provides a schematic diagram illustrating an LTE downlink subframe which includes a virtual carrier inserted in a host carrier in accordance with an example of the present invention.

In keeping with a conventional LTE downlink subframe, the first n symbols (n is three in FIG. 5) form the control region 300 which is reserved for the transmission of downlink control data such as data transmitted on the PDCCH. However, as can be seen from FIG. 5, outside of the control region 300 the LTE downlink subframe includes a group of resource elements positioned in this example below the central band 310 which form a virtual carrier 501. As explained farther below, the virtual carrier 501 is adapted so that data transmitted on the virtual carrier 501 can be treated as logically distinct from data transmitted in the remaining parts of the host carrier and can be decoded without decoding all the control data from the control region 300. Although FIG. 5 shows the virtual carrier occupying frequency resources below the centre band, in general the virtual carrier can occupy other frequency resources, for example, above the centre band or including the centre band. If the virtual carrier is configured to overlap any resources used by the PSS, SSS or PBCH of the host carrier, or any other signal transmitted by the host carrier that a terminal device operating on the host carrier would require for correct operation and expect to find in a known pre-determined location, the signals on the virtual carrier can be arranged such that these aspects of the host carrier signal are maintained.

As can be seen from FIG. 5, data transmitted on the virtual carrier 501 is transmitted across a limited bandwidth. This might be any suitable bandwidth smaller than that of the host carrier. In the example shown in FIG. 5 the virtual carrier is transmitted across a bandwidth comprising 12 blocks of 12 sub-carriers (i.e. 144 sub-carriers), which is equivalent to a 2.16 MHz transmission bandwidth. Accordingly, a terminal using the virtual carrier need only be equipped with a receiver capable of receiving and processing data transmitted over a bandwidth of 2.16 MHz. This enables low capability terminals (for example MTC type terminals) to be provided with simplified receiver units yet still be able to operate within an OFDM type communication network which, as explained above, conventionally requires terminals to be equipped with receivers capable of receiving and processing an OFDM signal across the entire bandwidth of the signal.

As explained above, in OFDM-based mobile communication systems such as LTE, downlink data is dynamically assigned to be transmitted on different sub-carriers on a subframe by subframe basis. Accordingly, in every subframe the network signals which sub-carriers on which symbols contain data relevant to which terminals (i.e. downlink allocation signalling).

As can be seen from FIG. 3, in a conventional downlink LTE subframe this information is transmitted on the PDCCH during the first symbol or symbols of the subframe. However, as previously explained, the information transmitted in the PDCCH is spread across the entire bandwidth of the subframe and therefore cannot be received by a mobile communication terminal with a simplified receiver unit capable only of receiving the reduced bandwidth virtual carrier.

Accordingly, as can be seen in FIG. 5, the final symbols of the virtual carrier can be reserved as a control region 502 for the virtual carrier for the transmission of control data indicating which resource elements of the virtual carrier 501 have been allocated to user equipment (UEs) using the virtual carrier. In some examples the number of symbols comprising the virtual carrier control region 502 might be fixed, for example three symbols. In other examples the virtual carrier control region 502 can vary in size, for example between one and three symbols, as with the control region 300.

The virtual carrier control region can be located at any suitable position, for example in the first few symbols of the virtual carrier. In the example of FIG. 5 this could mean positioning the virtual carrier control region on the fourth, fifth and sixth symbols. However, fixing the position of the virtual carrier control region in the final symbols of the subframe can be useful because the position of the virtual carrier control region will not vary in dependence on the number of symbols of the host carrier control region 300. This can help simplify the processing undertaken by mobile communication terminals receiving data on the virtual carrier because there is no need for terminals to determine a position of the virtual carrier control region every subframe if it is known that it will always be positioned in the final n symbols of the subframe.

In a further embodiment, the virtual carrier control symbols may reference virtual carrier PDSCH transmissions in a separate subframe.

In some examples the virtual carrier may be located within the centre band 310 of the downlink subframe. This can help reduce the impact on host carrier PDSCH resources caused by the introduction of the virtual carrier within the host carrier bandwidth since the resources occupied by the PSS/SSS and PBCH would be contained within the virtual carrier region and not the remaining host carrier PDSCH region. Therefore, depending on for example the expected virtual carrier throughput, the location of a virtual carrier can be appropriately chosen to either exist inside or outside the centre band according to whether the host or virtual carrier is chosen to bear the overhead of the PSS, SSS and PBCH.

Virtual Carrier "Camp-On" Process

As explained above, before a conventional LTE terminal can begin transmitting and receiving data in a cell, it first camps on to the cell. An adapted camp-on process can be provided for terminals using the virtual carrier.

Figure 6:
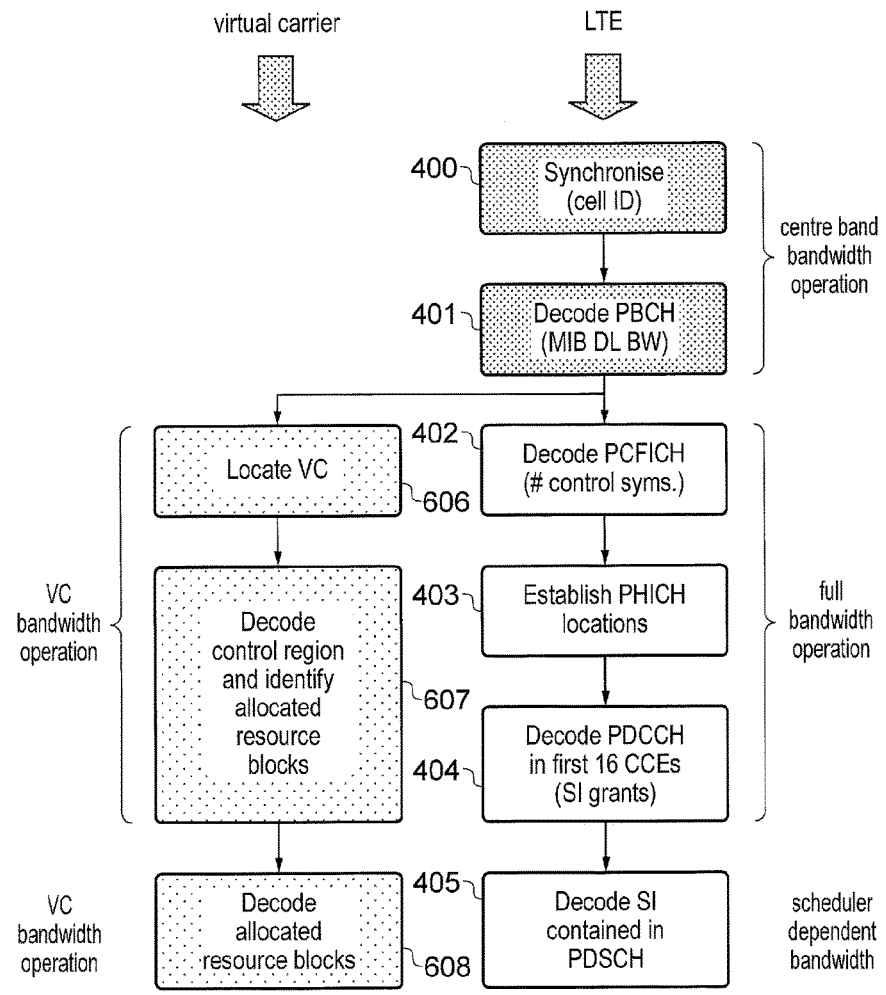
FIG. 6 provides a schematic diagram illustrating an adapted LTE "camp-on" procedure for camping on to a virtual carrier.

FIG. 6 shows a flow diagram schematically illustrating a camp-on process according to an example of the present invention. There are two branches shown in FIG. 6. Different steps of the process associated with a UE intending to use the virtual carrier are shown under the general heading "virtual carrier". The steps shown under the general heading "legacy LTE" are associated with a UE intending to use the host carrier, and these steps correspond to the steps of FIG. 4. In this example, the first two steps 400, 401 of the camp-on procedure are common to both the virtual carrier and host (legacy LTE) carrier.

The virtual carrier camp-on process is explained with reference to the example subframe shown in FIG. 5 in which a virtual carrier with a bandwidth of 144 sub-carriers is inserted within the operating bandwidth of a host carrier with a bandwidth corresponding to 1200 sub-carriers. As discussed above, a terminal having a receiver unit with an operational bandwidth of less than that of the host carrier cannot fully decode data in the control region of subframes of the host carrier. However, a receiver unit of a terminal having an operational bandwidth of only twelve blocks of twelve sub-carriers (i.e. 2.16 MHz) can receive control and user data transmitted on this example virtual carrier 502.

As noted above, in the example of FIG. 6, the first steps 400 and 401 for a virtual carrier terminal are the same as the conventional camp-on process shown in FIG. 4, although a virtual carrier terminal may extract additional information from the MIB as described below. Both types of terminals (i.e. virtual carrier terminals and host/legacy carrier terminals) can use the PSS/SSS and PBCH to synchronize with the base station using the information carried on the 72 sub-carrier centre band within the host carrier. However, where the conventional LTE terminals then continue with the process by performing the PCFICH decoding step 402, which requires a receiver unit capable of receiving and decoding the host carrier control region 300, a terminal camping on to the cell to receive data on the virtual carrier (which may be referred to as a "virtual carrier terminal") performs steps 606 and 607 instead.

In a further example a separate synchronisation and PBCH functionality can be provided for the virtual carrier device as opposed to re-using the same conventional initial camp-on processes of steps 400 and 401 of the host carrier device.

Figure 7:
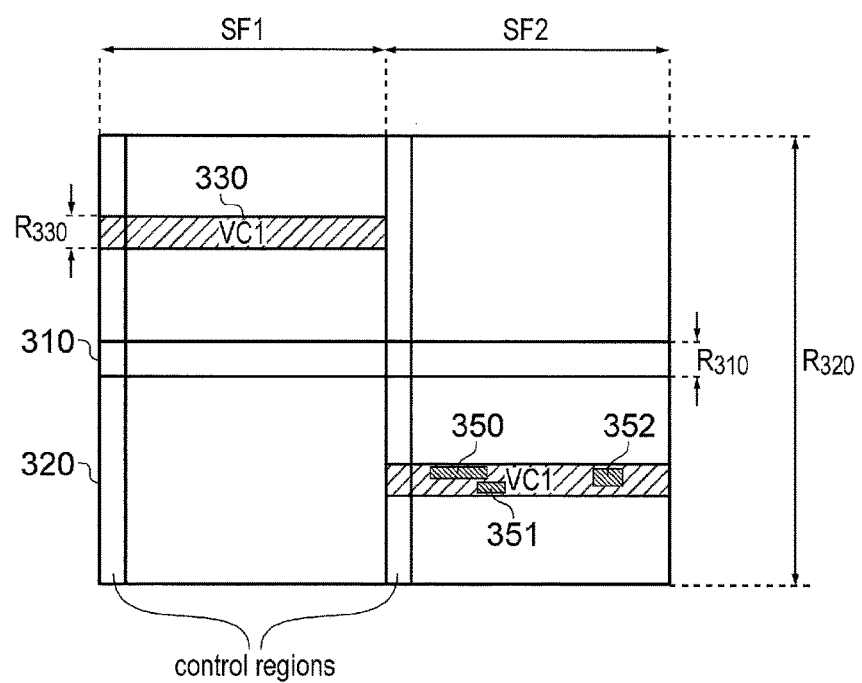
FIG. 7 provides a schematic diagram illustrating LTE downlink radio subframes in accordance with an embodiment of the present invention.

At step 606, the virtual carrier terminal locates a virtual carrier, if any is provided within the host carrier, using a virtual carrier-specific step. Various examples of how this step may be performed are discussed further below. Once the virtual carrier terminal has located a virtual carrier, it can access information within the virtual carrier. For example, if the virtual carrier mirrors the conventional LTE resource allocation method, the virtual carrier terminal may proceed to decode control portions within the virtual carrier, which can, for example, indicate which resource elements within the virtual carrier have been allocated for a specific virtual carrier terminal or for system information. For example, FIG. 7 shows the blocks of resource elements 350 to 352 within virtual carrier 330 that have been allocated for the subframe SF2. However, there is no requirement for the virtual carrier terminal to follow or mirror the conventional LTE process (e.g. steps 402-404) and these steps may for example be implemented very differently for a virtual carrier camp-on process.

Regardless of the virtual carrier terminal following a LTE-like step or a different type of step when performing step 607, the virtual carrier terminal can then decode the allocated resource elements at step 608 and thereby receive data transmitted by the base station broadcasting the virtual carrier. The data decoded in step 608 may include, for example, the remainder of the system information containing details of the network configuration.

Even though the virtual carrier terminal does not have the bandwidth capabilities to decode and receive downlink data if it was transmitted in the host carrier using conventional LTE, it can still access a virtual carrier within the host carrier having a limited bandwidth whilst re-using the initial LTE steps. Step 608 may also be implemented in a LTE-like manner or in a different manner. For example, multiple virtual carrier terminals may share a virtual carrier and have grants allocated to manage the virtual carrier sharing as shown in SF2 in FIG. 7, or, in another example, a virtual carrier terminal may have the entire virtual carrier allocated for its own downlink transmissions, or the virtual carrier may be entirely allocated to a virtual carrier terminal for a certain number of subframe only, etc.

There is thus a large degree of flexibility provided for the virtual carrier camp-on process. There is, for example, the ability to adjust a balance between re-using or mirroring conventional LTE steps or processes, thereby reducing the terminal complexity and the need to implement new elements, and adding new virtual carrier specific aspects or implementations, thereby potentially optimizing the use of narrow-band virtual carriers, as LTE has been designed with the larger-band host carriers in mind.

Downlink Virtual Carrier Detection

As discussed above, the virtual carrier terminal should locate (within the time-frequency resource grid of the host carrier) the virtual carrier before it can receive and decode transmissions on the virtual carrier. Several alternatives are available for the virtual carrier presence and location determination, which can be implemented separately or in combination. Some of these options are discussed below.

To facilitate the virtual carrier detection, the virtual carrier location information may be provided to the virtual carrier terminal such that it can locate the virtual carrier, if any exists, more easily. For example, such location information may comprise an indication that one or more virtual carriers are provided within the host carrier, or that the host carrier does not currently provide any virtual carrier. It may also comprise an indication of the virtual carrier's bandwidth, for example in MHz or blocks of resource elements. Alternatively, or in combination, the virtual carrier location information may comprise the virtual carrier's centre frequency and bandwidth, thereby giving the virtual carrier terminal the location and bandwidth of any active virtual carrier. In the event the virtual carrier is to be found at a different frequency position in each subframe, according, for example, to a pseudo-random hopping algorithm, the location information can, for example, indicate a pseudo random parameter. Such parameters may include a starting frame and parameters used for the pseudo-random algorithm. Using these pseudo-random parameters, the virtual carrier terminal can then know where the virtual carrier can be found for any subframe.

Figure 8:
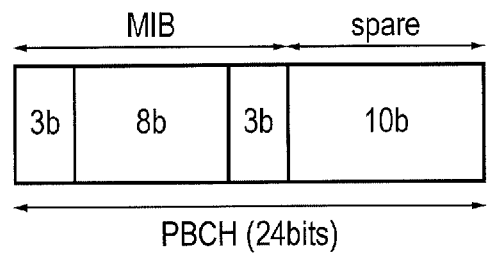
FIG. 8 provides a schematic diagram illustrating a physical broadcast channel (PBCH)
Figure 9:
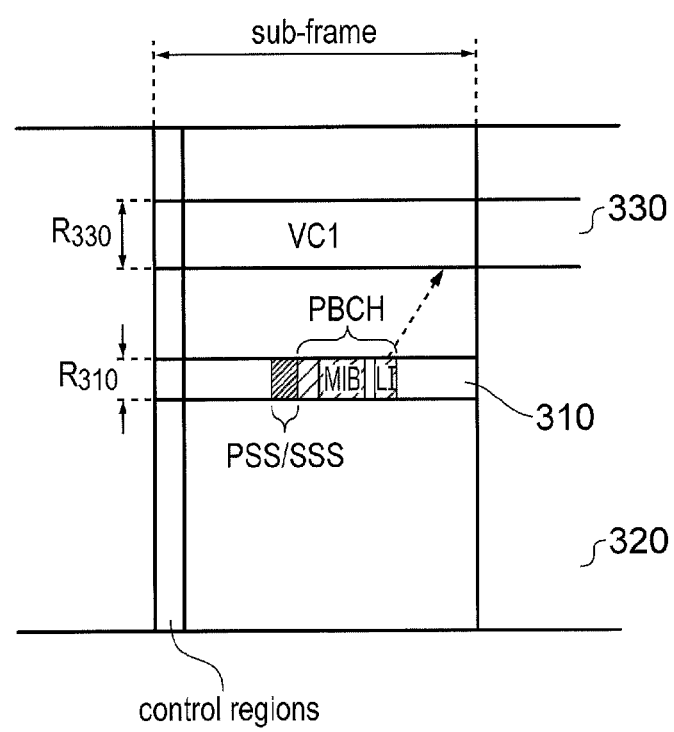
FIG. 9 provides a schematic diagram illustrating an LTE downlink radio subframe in accordance with an embodiment of the present invention.

On implementation feature associated with little change to the virtual carrier terminal (as compared with a conventional LTE terminal) would be to include location information for the virtual carrier within the PBCH, which already carries the Master Information Block, or MIB in the host carrier centre band. As shown in FIG. 8, the MIB consists of 24 bits (3 bits to indicate DL bandwidth, 8 bits to indicate the System Frame Number or SFN, and 3 bits regarding the PHICH configuration). The MIB therefore comprises 10 spare bits that can be used to carry location information in respect of one or more virtual carriers. For example, FIG. 9 shows an example where the PBCH includes the MIB and location information ("LI") for pointing any virtual carrier terminal to a virtual carrier.

Alternatively, virtual carrier location information could be provided in the centre band, outside of the PBCH. It can for example be always provided after and adjacent to the PBCH. By providing the location information in the centre band but outside of the PBCH, the conventional PBCH is not modified for the purpose of using virtual carriers, but a virtual carrier terminal can easily find the location information in order to detect the virtual carrier, if any.

The virtual carrier location information, if provided, can be provided elsewhere in the host carrier, but it may be advantageous to provide it in the centre band, for example because a virtual carrier terminal may configure its receiver to operate on the centre band and the virtual carrier terminal then does not need to adjust its receiver settings for finding the location information.

Depending on the amount of virtual carrier location information provided, the virtual carrier terminal can either adjust its receiver to receive the virtual carrier transmissions, or it may require further location information before it can do so.

If for example, the virtual carrier terminal was provided with location information indicating a virtual carrier presence and/or a virtual carrier bandwidth but not indicating any details as to the exact virtual carrier frequency range, or if the virtual carrier terminal was not provided with any location information, the virtual carrier terminal could then scan the host carrier for a virtual carrier (e.g. performing a so-called blind search process). Scanning the host carrier for a virtual carrier can be based on different approaches, some of which will be presented below.

Figure 10:
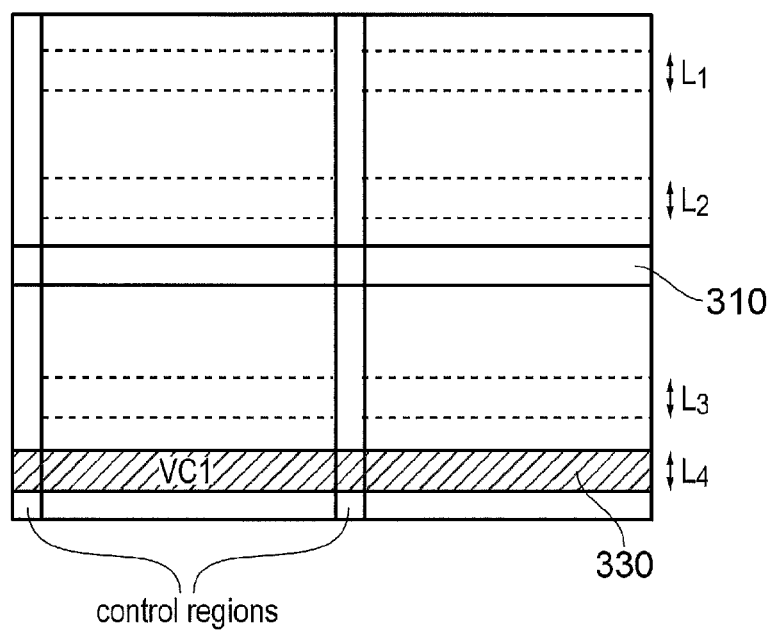
FIG. 10 provides a schematic diagram illustrating an LTE downlink radio subframe in which a virtual carrier has been inserted in accordance with an embodiment of the invention.
Figure 11A:
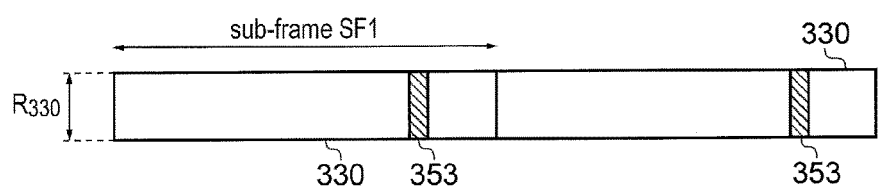
FIGS. 11A to 11D provide schematic diagrams illustrating positioning of location signals within a LTE downlink subframe according to embodiments of the present invention.
Figure 11B:
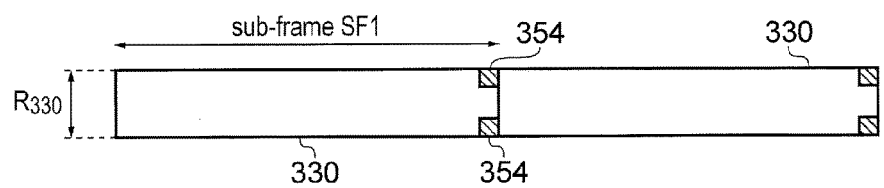
Figure 11C:
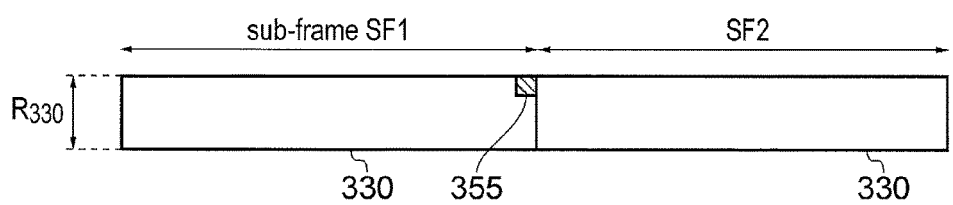

According to a first approach, a virtual carrier might only be inserted in certain pre-determined locations, as illustrated for example in FIG. 10 for a four-location example. The virtual carrier terminal then scans the four locations L1-L4 for any virtual carrier. If and when the virtual carrier terminal detects a virtual carrier, it can then "camp-on" the virtual carrier to receive downlink data as described above. In this approach, the virtual carrier terminal may be provided with the possible virtual carrier locations in advance, for example they may be stored as a network-specific setting in an internal memory. Detection of a virtual carrier could be accomplished by seeking to decode a particular physical channel on the virtual carrier. The successful decoding of such a channel, indicated for example by a successful cyclic redundancy check (CRC) on decoded data, would indicate the successful location of the virtual carrier According to a second approach, the virtual carrier may include location signals such that a virtual carrier terminal scanning the host carrier can detect such signals to identify the presence of a virtual carrier. Examples of possible location signals are illustrated in FIGS. 11A to 11D. In the examples of FIGS. 11A to 11C, the virtual carrier regularly sends an arbitrary location signal such that a terminal scanning a frequency range where the location signal is would detect this signal. An "arbitrary" signal is intended here to include any signal that does not carry any information as such, or is not meant to be interpreted, but merely includes a specific signal or pattern that a virtual carrier terminal can detect. This can for example be a series of positive bits across the entire location signal, an alternation of 0 and 1 across the location signal, or any other suitable arbitrary signal. It is noteworthy that the location signal may be made of adjacent blocks of resource elements or may be formed of non-adjacent blocks. For example, it may be located at every other block of resource elements at the "top" (i.e. upper frequency limit) of the virtual carrier.

In the example of FIG. 11A, the location signal 353 extends across the range $R_{330}$ of the virtual carrier 330 and is always found at the same position in the virtual carrier within a subframe. If the virtual carrier terminal knows where to look for a location signal in a virtual carrier subframe, it can then simplify its scanning process by only scanning this position within a subframe for a location signal. FIG. 11B shows a similar example where every subframe includes a location signal 354 comprising two parts: one at the top corner and one at the bottom corner of the virtual carrier subframe, at the end of this subframe. Such a location signal may be useful if, for example, the virtual carrier terminal does not know the bandwidth of the virtual carrier in advance as it can facilitate a clear detection of the top and bottom frequency edges of the virtual carrier band.

In the example of FIG. 11C, a location signal 355 is provided in a first subframe SF1, but not in a second subframe SF2. The location signal can for example be provided every two subframes. The frequency of the location signals can be chosen to adjust a balance between reducing scanning time and reducing overhead. In other words, the more often the location signal is provided, the less long it takes a terminal to detect a virtual carrier but the more overhead there is.

Figure 11D:
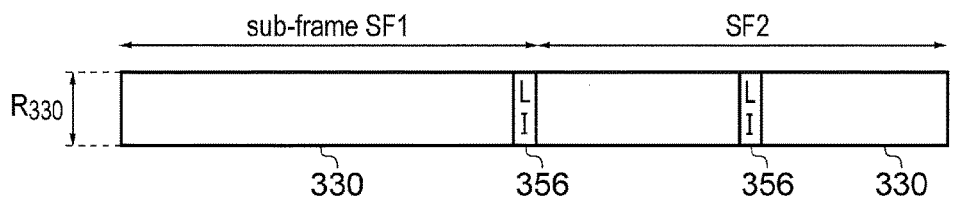

In the example of FIG. 11D, a location signal is provided where this location signal is not an arbitrary signal as in FIGS. 11A to 11C, but is a signal that includes information for virtual carrier terminals. The virtual carrier terminals can detect this signal when they scan for a virtual carrier and the signal may include information in respect of, for example, the virtual carrier bandwidth or any other virtual carrier-related information (location or non-location information). When detecting this signal, the virtual carrier terminal can thereby detect the presence and location of the virtual carrier. As shown in FIG. 11D, the location signal can, like an arbitrary location signal, be found at different locations within the subframe, and the location may vary on a per-subframe basis.

Dynamic Variation of Control Region Size of Host Carrier

As explained above, in LTE the number of symbols that make up the control region of a downlink subframe varies dynamically depending on the quantity of control data that needs to be transmitted. Typically, this variation is between one and three symbols. As will be understood with reference to FIG. 5, variation in the width of the host carrier control region will cause a corresponding variance in the number of symbols available for the virtual carrier. For example, as can be seen in FIG. 5, when the control region is three symbols in length and there are 14 symbols in the subframe, the virtual carrier is eleven symbols long. However, if in the next subframe the control region of the host carrier were reduced to one symbol, there would be thirteen symbols available for the virtual carrier in that subframe.

When a virtual carrier is inserted into a LTE host carrier, mobile communication terminals receiving data on the virtual carrier need to be able to determine the number of symbols in the control region of each host carrier subframe to determine the number of symbols in the virtual carrier in that subframe if they are to be able to use all available symbols that are not used by the host carrier control region.

Conventionally, the number of symbols forming the control region is signalled in the first symbol of every subframe in the PCFICH. However, the PCFICH is typically distributed across the entire bandwidth of the downlink LTE subframe and is therefore transmitted on sub-carriers which virtual carrier terminals capable only of receiving the virtual carrier cannot receive. Accordingly, in one embodiment, any symbols across which the control region could possibly extend are predefined as null symbols on the virtual carrier, i.e. the length of the virtual sub-carrier is set at (m−n) symbols, where m is the total number of symbols in a subframe and n is the maximum number of symbols of the control region. Thus, resource elements are never allocated for downlink data transmission on the virtual carrier during the first n symbols of any given subframe.

Although this embodiment is simple to implement it will be spectrally inefficient because during subframes when the control region of the host carrier has fewer than the maximum number of symbols, there will be unused symbols in the virtual carrier.

In another embodiment, the number of symbols in the control region of the host carrier is explicitly signalled in the virtual carrier itself. Once the number of symbols in the control region of the host carrier is known, the number of symbols in the virtual carrier can be calculated by subtracting the total number of symbols in the subframe from this number.

In one example an explicit indication of the host carrier control region size is given by certain information bits in the virtual carrier control region. In other words an explicit signalling message is inserted at a predefined position in the virtual carrier control region 502. This predefined position is known by each terminal adapted to receive data on the virtual carrier.

In another example, the virtual carrier includes a predefined signal, the location of which indicates the number of symbols in the control region of the host carriers. For example, a predefined signal could be transmitted on one of three predetermined blocks of resource elements. When a terminal receives the subframe it scans for the predefined signal. If the predefined signal is found in the first block of resource elements this indicates that the control region of the host carrier comprises one symbol; if the predefined signal is found in the second block of resource elements this indicates that the control region of the host carrier comprises two symbols and if the predefined signal is found in the third block of resource elements this indicates that the control region of the host carrier comprises three symbols.

In another example, the virtual carrier terminal is arranged to first attempt to decode the virtual carrier assuming that the control region size of the host carrier is one symbol. If this is not successful, the virtual carrier terminal attempts to decode the virtual carrier assuming that the control region size of the host carrier is two and so on, until the virtual carrier terminal successfully decodes the virtual carrier.

Downlink Virtual Carrier Reference Signals

As is known in the art, in OFDM-based transmission systems, such as LTE, a number of sub-carriers in symbols throughout the subframes are typically reserved for the transmission of reference signals. As explained further below, reference symbols play a significant role in some embodiments of the invention. However, some conventional aspects of reference symbols are first described. Reference signals are conventionally transmitted on sub-carriers distributed throughout a subframe across the channel bandwidth and across the OFDM symbols. The reference signals are arranged in a repeating pattern and can be used by a receiver to estimate the channel function applied to the data transmitted on each sub-carrier using extrapolation and interpolation techniques. These reference signals are also typically used for additional purposes such as determining metrics for received signal power indications, automatic frequency control metrics and automatic gain control metrics. In LTE the positions of the reference signal bearing sub-carriers within each subframe are pre-determined and known at the transceiver of each terminal.

In a conventional LTE downlink subframes, there are a number of different reference signals, transmitted for different purposes. One example is the cell-specific reference signal, broadcast to all terminals. Cell-specific reference symbols are typically inserted on every sixth sub-carrier on each transmit antenna port on which they occur. Accordingly, if a virtual carrier is inserted in an LTE downlink subframe, even if the virtual carrier has a minimum bandwidth of one resource block (i.e. twelve sub-carriers) the virtual carrier will include at least some cell-specific reference signal bearing sub-carriers.

There are sufficient reference signal bearing sub-carriers provided in each subframe such that a receiver need not accurately receive every single reference signal to decode the data transmitted in the subframe. However, as will be understood the more reference signals that are received, the better a receiver will generally be able to estimate the channel response, and hence fewer errors will typically be introduced into the data decoded from the subframe. Accordingly, in order to preserve compatibility with LTE communication terminals receiving data on the host carrier, in accordance with some examples of the present invention, the sub-carrier positions that would contain reference signals in a conventional LTE subframe are retained in the virtual carrier, subject to the exceptions discussed further below in accordance with embodiments of the invention.

As will be understood, in accordance with examples of the present invention, terminals arranged to receive only the virtual carrier receive a reduced number of sub-carriers compared to conventional LTE terminals which receive each subframe across the entire bandwidth of the subframe. As a result, the reduced capability terminals receive fewer reference signals over a narrower range of frequencies which may result in a less accurate channel estimation being generated.

In some examples a simplified virtual carrier terminal may have a lower mobility which requires fewer reference symbols to support channel estimation. However, in some examples of the present invention the downlink virtual carrier may include additional reference signal bearing sub-carriers to enhance the accuracy of the channel estimation that the reduced capability terminals can generate (i.e. there may be a greater density of reference symbols on the virtual carrier as compared to other regions on the host carrier).

In some examples the positions of the additional reference bearing sub-carriers are such that they are systematically interspersed with respect to the positions of the conventional reference signal bearing sub-carriers thereby increasing the sampling frequency of the channel estimation when combined with the reference signals from the existing reference signal bearing sub-carriers. This allows an improved channel estimation of the channel to be generated by the reduced capability terminals across the bandwidth of the virtual carrier. In other examples, the positions of the additional reference bearing sub-carriers are such that they are systematically placed at the edge of the bandwidth of the virtual carrier thereby increasing the interpolation accuracy of the virtual carrier channel estimates.

Alternative Virtual Carrier Arrangements

Figure 12:
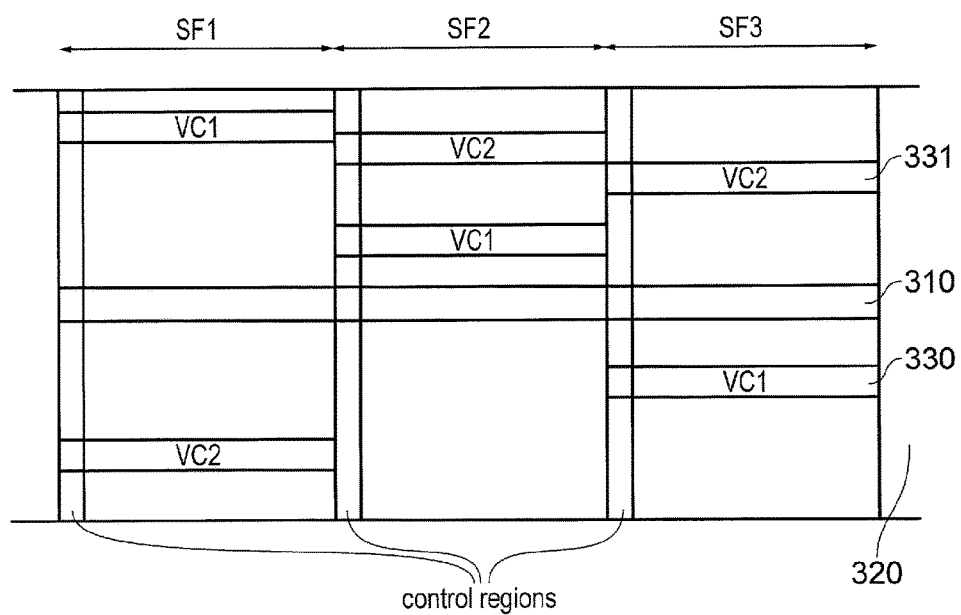
FIG. 12 provides a schematic diagram illustrating a group of subframes in which two virtual carriers change location within a host carrier band according to an embodiment of the present invention.

So far examples of the invention have been described generally in terms of a host carrier in which a single virtual carrier has been inserted as shown for example in FIG. 5. However, in some examples a host carrier may include more than one virtual carrier as shown for example in FIG. 12. FIG. 12 shows an example in which two virtual carriers VC1 (330) and VC2 (331) are provided within a host carrier 320. In this example, the two virtual carriers change location within the host carrier band according to a pseudo-random algorithm. However, in other examples, one or both of the two virtual carriers may always be found in the same frequency range within the host carrier frequency range and/or may change position according to a different mechanism. In LTE, the number of virtual carriers within a host carrier is only limited by the size of the host carrier. However, too many virtual carriers within the host carrier may unduly limit the bandwidth available for transmitting data to conventional LTE terminals and an operator may therefore decide on a number of virtual carrier within a host carrier according to, for example, a ratio of conventional LTE users/virtual carrier users.

In some examples the number of active virtual carriers can be dynamically adjusted such that it fits the current needs of conventional LTE terminals and virtual carrier terminals. For example, if no virtual carrier terminal is connected or if their access is to be intentionally limited, the network can arrange to begin scheduling the transmission of data to LTE terminals within the sub-carriers previously reserved for the virtual carrier. This process can be reversed if the number of active virtual carrier terminals begins to increase. In some examples the number of virtual carriers provided may be increased in response to an increase in the presence of virtual carrier terminals. For example if the number of virtual carrier terminals present in a network or area of a network exceeds a threshold value, an additional virtual carrier is inserted in the host carrier. The network elements and/or network operator can thus activate or deactivate the virtual carriers whenever appropriate.

The virtual carrier shown for example in FIG. 5 is 144 sub-carriers in bandwidth. However, in other examples a virtual carrier may be of any size between twelve sub-carriers to 1188 sub-carriers (for a carrier with a 1200 sub-carrier transmission bandwidth). Because in LTE the centre band has a bandwidth of 72 sub-carriers, a virtual carrier terminal in an LTE environment preferentially has a receiver bandwidth of at least 72 sub-carriers (1.08 MHz) such that it can decode the centre band 310, therefore a 72 sub-carrier virtual carrier may provide a convenient implementation option. With a virtual carrier comprising 72 sub-carriers, the virtual carrier terminal does not have to adjust the receiver's bandwidth for camping on the virtual carrier which may therefore reduce complexity of performing the camp-on process, but there is no requirement to have the same bandwidth for the virtual carrier as for the centre band and, as explained above, a virtual carrier based on LTE can be of any size between 12 to 1188 sub-carriers. For example, in some systems, a virtual carrier having a bandwidth of less than 72 sub-carriers may be considered as a waste of the virtual carrier terminal's receiver resources, but from another point of view, it may be considered as reducing the impact of the virtual carrier on the host carrier by increasing the bandwidth available to conventional LTE terminals. The bandwidth of a virtual carrier can therefore be adjusted to achieve the desired balance between complexity, resource utilization, host carrier performance and requirements for virtual carrier terminals.

Uplink Transmission Frame

So far, the virtual carrier has been discussed primarily with reference to the downlink, however in some examples a virtual carrier can also be inserted in the uplink.

In frequency division duplex (FDD) networks both the uplink and downlink are active in all subframes, whereas in time division duplex (TDD) networks subframes can either be assigned to the uplink, to the downlink, or further sub-divided into uplink and downlink portions.

In order to initiate a connection to a network, conventional LTE terminals make a random access request on the physical random access channel (PRACH). The PRACH is located in predetermined blocks of resource elements in the uplink frame, the positions of which are signaled to the LTE terminals in the system information signaled on the downlink.

Additionally, when there is pending uplink data to be transmitted from an LTE terminal and the terminal does not already have any uplink resources allocated to it, it can transmit a random access request PRACH to the base station. A decision is then made at the base station as to which if any uplink resource is to be allocated to the terminal device that has made the request. Uplink resource allocations are then signaled to the LTE terminal on the physical downlink control channel (PDCCH) transmitted in the control region of the downlink subframe.

In LTE, transmissions from each terminal device are constrained to occupy a set of contiguous resource blocks in a frame. For the physical uplink shared channel (PUSCH) the uplink resource allocation grant received from the base station will indicate which set of resource blocks to use for that transmission, where these resource blocks could be located anywhere within the channel bandwidth.

The first resources used by the LTE physical uplink control channel (PUCCH) are located at both the upper and lower edge of the channel, where each PUCCH transmission occupies one resource block. In the first half of a subframe this resource block is located at one channel edge, and in the second half of a subframe this resource block is located at the opposite channel edge. As more PUCCH resources are required, additional resource blocks are assigned in a sequential manner, moving inward from the channel edges. Since PUCCH signals are code division multiplexed, an LTE uplink can accommodate multiple PUCCH transmissions in the same resource block.

Virtual Uplink Carrier

In accordance with embodiments of the present invention, the virtual carrier terminals described above can also be provided with a reduced capability transmitter for transmitting uplink data. The virtual carrier terminals are arranged to transmit data across a reduced bandwidth. The provision of a reduced capability transmitter unit provides corresponding advantages to those achieved by providing a reduced capability receiver unit with, for example, classes of devices that are manufactured with a reduced capability for use with, for example, MTC type applications.

Figure 13A:
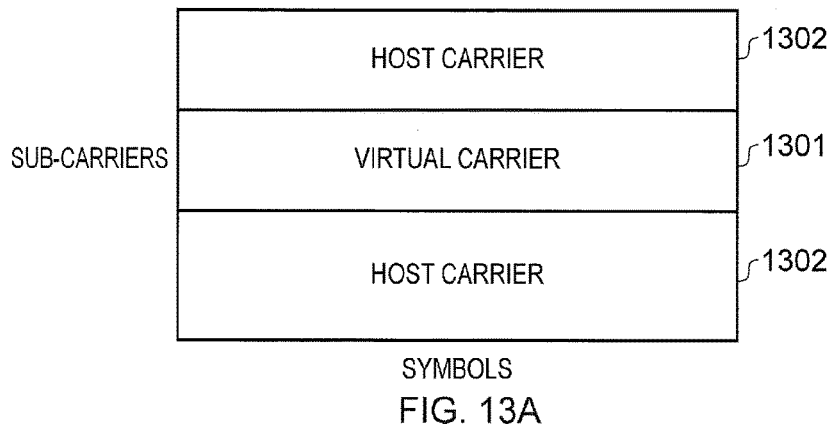
FIGS. 13A to 13C provide schematic diagrams illustrating LTE uplink subframes in which an uplink virtual carrier has been inserted in accordance with an embodiment of the present invention.

In correspondence with the downlink virtual carrier, the virtual carrier terminals transmit uplink data across a reduced range of sub-carriers within a host carrier that has a greater bandwidth than that of the reduced bandwidth virtual carrier. This is shown in FIG. 13A. As can be seen from FIG. 13A, a group of sub-carriers in an uplink subframe form a virtual carrier 1301 within a host carrier 1302. Accordingly, the reduced bandwidth across which the virtual carrier terminals transmit uplink data can be considered a virtual uplink carrier.

In order to implement the virtual uplink carrier, the base station scheduler serving a virtual carrier ensures that all uplink resource elements granted to virtual carrier terminals are sub-carriers that fall within the reduced bandwidth range of the reduced capability transmitter units of the virtual carrier terminals. Correspondingly, the base station scheduler serving the host carrier typically ensures that all uplink resource elements granted to host carrier terminals are sub-carriers that fall outside the set of sub-carriers occupied by the virtual carrier terminals. However, if the schedulers for the virtual carrier and the host carrier are implemented jointly, or have means to share information, then the scheduler of the host carrier can assign resource elements from within the virtual carrier region to terminal devices on the host carrier during subframes when the virtual carrier scheduler indicates that some or all of the virtual carrier resources will not be used by terminal devices on the virtual carrier.

If a virtual carrier uplink incorporates a physical channel that follows a similar structure and method of operation to the LTE PUCCH, where resources for that physical channel are expected to be at the channel edges, for virtual carrier terminals these resources could be provided at the edges of the virtual carrier bandwidth and not at the edges of the host carrier.

This is advantageous since it would ensure that virtual carrier uplink transmissions remain within the reduced virtual carrier bandwidth.

Virtual Uplink Carrier Random Access

Figure 13B:
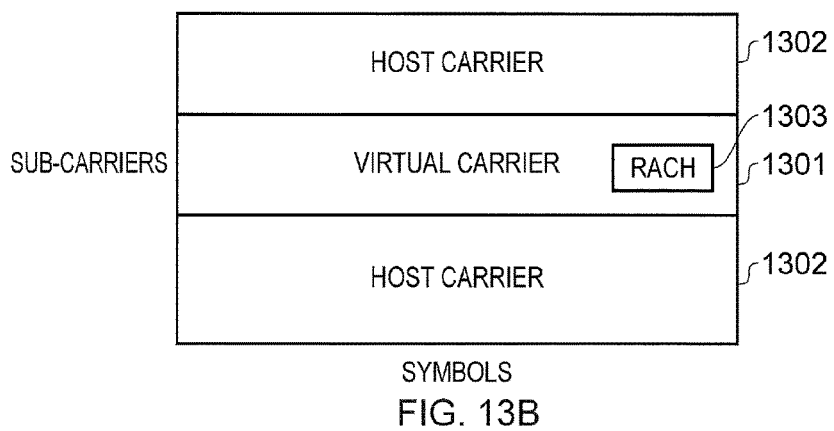

In accordance with conventional LTE techniques, it cannot be guaranteed that the PRACH will be within the sub-carriers allocated to the virtual carrier. In some embodiments therefore, the base station provides a secondary PRACH within the virtual uplink carrier, the location of which can be signaled to the virtual carrier terminals via system information on the virtual carrier. This is shown for example in FIG. 13B in which a PRACH 1303 is located within the virtual carrier 1301. Thus, the virtual carrier terminals send PRACH requests on the virtual carrier PRACH within the virtual uplink carrier. The position of the PRACH can be signaled to the virtual carrier terminals in a virtual carrier downlink signaling channel, for example in system information on the virtual carrier.

Figure 13C:
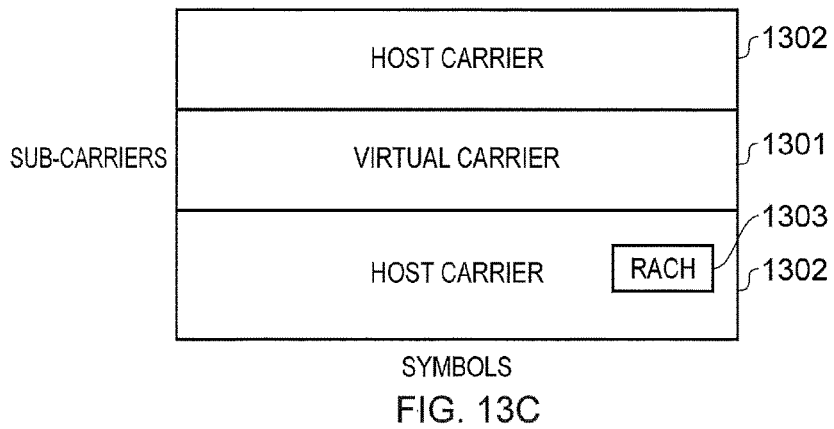

However, in other examples, the virtual carrier PRACH 1303 is situated outside of the virtual carrier as shown for example in FIG. 13C. This leaves more room within the virtual uplink carrier for the transmission of data by the virtual carrier terminals. The position of the virtual carrier PRACH is signaled to the virtual carrier terminals as before but in order to transmit a random access request, the virtual carrier terminals re-tune their transmitter units to the virtual carrier PRACH frequency because it is outside of the virtual carrier. The transmitter units are then re-tuned to the virtual carrier frequency when uplink resource elements have been allocated.

In some examples where the virtual carrier terminals are capable of transmitting on a PRACH outside of the virtual carrier, the position of the host carrier PRACH can be signaled to the virtual carrier terminals. The virtual carrier terminals can then simply use the conventional host carrier PRACH resource to send random access requests. This approach is advantageous as fewer PRACH resources have to be allocated.

However, if the base station is receiving random access requests from both conventional LTE terminals and virtual carrier terminals on the same PRACH resource, it is necessary that the base station is provided with a mechanism for distinguishing between random access requests from conventional LTE terminals and random access requests from virtual carrier terminals.

Therefore, in some examples a time division allocation is implemented at the base station whereby, for example, over a first set of subframes the PRACH allocation is available to the virtual carrier terminals and over a second set of subframes the PRACH allocation is available to conventional LTE terminals. Accordingly, the base station can determine that random access requests received during the first set of subframes originate from virtual carrier terminals and random access requests received during the second set of subframes originate from conventional LTE terminals.

In other examples, no mechanism is provided to prevent both virtual carrier terminals and conventional LTE terminals transmitting random access requests at the same time. However, the random access preambles that are conventionally used to transmit a random access request are divided into two groups. The first group is used exclusively by virtual carrier terminals and the second group is used exclusively by conventional LTE terminals. Accordingly, the base station can determine whether a random request originated from a conventional LTE terminal or a virtual carrier terminal simply by ascertaining to what group the random access preamble belongs.

Example Architecture

Figure 14:
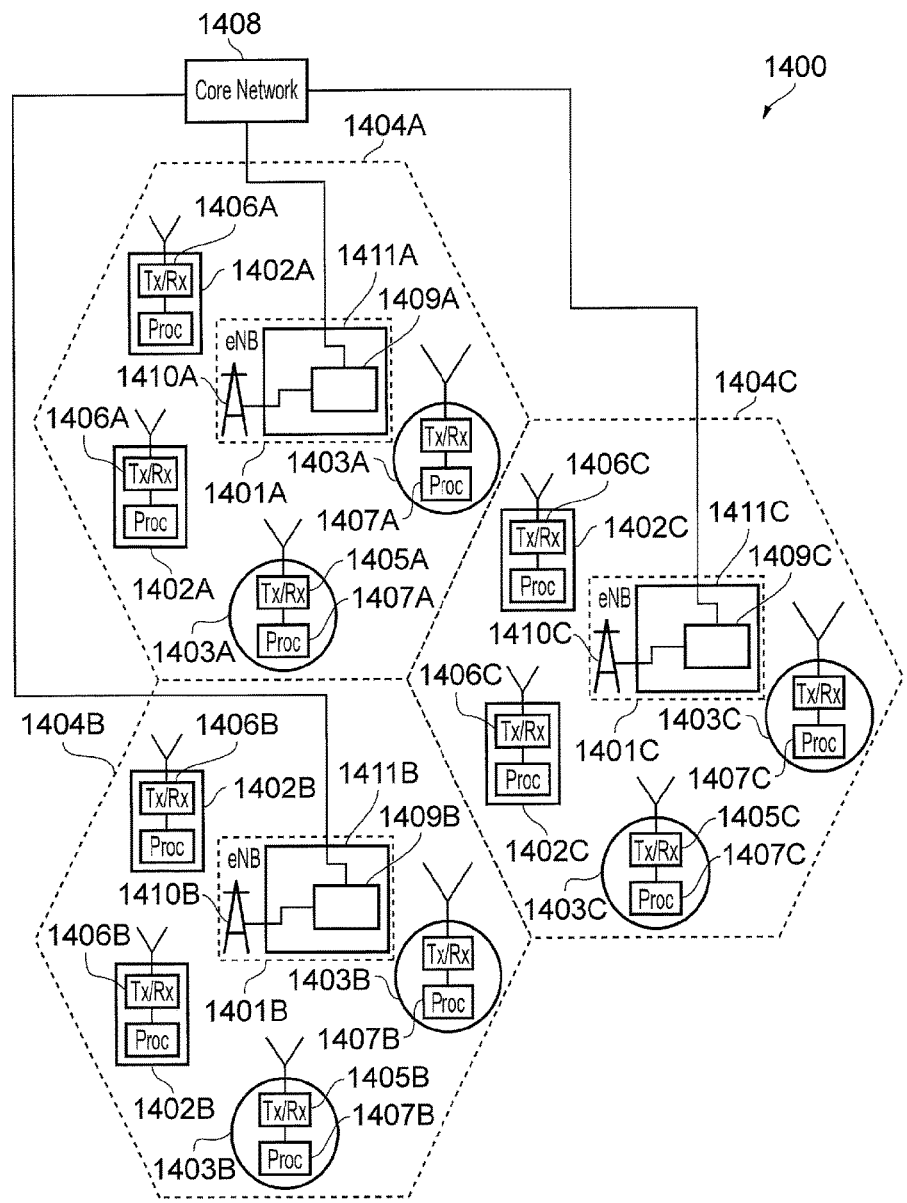
FIG. 14 provides a schematic diagram showing part of an adapted LTE mobile telecommunication network arranged in accordance with an example of the present invention.

FIG. 14 provides a schematic diagram showing part of a telecommunications system 1400 arranged in accordance with an example of the present invention. The telecommunications system 1400 in this example is based broadly on an LTE-type architecture in which a virtual carrier, such as described above, is implemented. As such many aspects of the operation of the telecommunications system 1400 are known and understood and are not described here in detail in the interest of brevity. Operational aspects of the telecommunications system 1400 which are not specifically described herein may be implemented in accordance with any known techniques, for example according to the current LTE-standards with appropriate modifications to support virtual carriers as has been previously proposed.

Represented in FIG. 14 are three neighbouring communication cells 1404A, B, C supported by respective base stations 1401A, B, C coupled to a core network 1408 and adapted in accordance with an embodiment of the invention. In general a system such as that represented in FIG. 14 may comprise a greater number of cells arranged to provide coverage to a desired geographic area. As is conventional for LTE-type networks, the respective base stations 1401A, B, C may communicate with one another over the so-called X2 interface which interconnects base stations in a peer-to-peer fashion.

Thus communication cell 1404A includes the base station (enhanced Node B/eNB) 1401A connected to the core network 1408. The base station 1401A comprises a transceiver unit 1410A for transmission and reception of wireless signals and a controller unit 1411A configured to control the base station 1401A. The controller unit 1411A may again comprise various sub-units, such as a scheduling unit 1409A and other functional units for providing functionality in accordance with embodiments of the invention as explained further below. These sub units may be implemented as discrete hardware elements or as appropriately configured functions of the controller unit. Thus, the controller unit 1411A may comprise a processor unit which is suitably configured/programmed to provide the desired functionality described herein using conventional programming/configuration techniques for equipment in wireless telecommunications systems. The transceiver unit 1410A and the controller unit 1411A are schematically shown in FIG. 14 as separate elements for ease of representation. However, it will be appreciated that the functionality of these units can be provided in various different ways following established practices in the art, for example using a single suitably programmed integrated circuit coupled to an antenna. It will be appreciated the base station 1401A will in general comprise various other elements associated with its operating functionality.

The base station 1401A communicates data to a plurality of conventional. LTE terminals 1402A and reduced capability terminals 1403A within the coverage area of the cell 1404A. Each of the reduced capability terminals 1403A has a transceiver unit 1405A which includes a receiver unit capable of receiving data across a reduced bandwidth and a transmitter unit capable of transmitting data across a reduced bandwidth when compared with the capabilities of transceiver units 1406A included in the conventional LTE terminals 1402A.

The base station 1401A is arranged to transmit downlink data using a subframe structure that supports a virtual carrier data as described above, for example with reference to FIG. 5, and to receive uplink data using a subframe structure as described above, for example with reference to FIG. 13B or 13C. The reduced capability terminals 1403A are thus able to receive and transmit data using the uplink and downlink virtual carriers as described above.

As has been explained above, because the reduced complexity terminals 1403A receive and transmit data across a reduced bandwidth on the uplink and downlink virtual carriers, the complexity, power consumption and cost of the transceiver unit 1405A needed to receive and decode downlink data and to encode and transmit uplink data is reduced compared to the transceiver unit 1406A provided in the conventional LTE terminals.

When receiving downlink data from the core network 1408A to be transmitted to one of the terminals within the cell 1404A, the adapted base station 1401A is arranged to determine if the data is bound for a conventional LTE terminal 1402A or a reduced capability terminal 1403A. This can be achieved using any suitable technique. For example, data bound for a reduced capability terminal 1403A may include a virtual carrier flag indicating that the data should be transmitted on the downlink virtual carrier. If the adapted base station 1401A detects that downlink data is to be transmitted to a reduced capability terminal 1403A, an adapted scheduling unit 1409A included in the adapted base station 1401A ensures that the downlink data is transmitted to the reduced capability terminal in question on the downlink virtual. In another example the network may be arranged so that the virtual carrier is logically independent of the base station. More particularly the virtual carrier may be arranged to appear to the core network as a distinct cell so that it is not known to the core network that the virtual carrier has any relationship with the host carrier. Packets are simply routed to/from the virtual carrier just as they would be for a conventional cell.

In another example, packet inspection is performed at a suitable point within the network to route traffic to or from the appropriate carrier (i.e. the host carrier or the virtual carrier).

In yet another example, data from the core network to the base station is communicated on a specific logical connection for a specific terminal device. The base station is provided with information indicating which logical connection is associated with which terminal device. Information is also provided at the base station indicating which terminal devices are virtual carrier terminals and which are conventional LTE terminals. This information could be derived from the fact that a virtual carrier terminal would initially have connected using virtual carrier resources. In other examples virtual carrier terminals are arranged to indicate their capability to the base station during the connection procedure. Accordingly the base station can map data from the core network to a specific terminal device based on whether the terminal device is a virtual carrier terminal or an LTE terminal.

When scheduling resources for the transmission of uplink data, the adapted base station 1401A is arranged to determine if the terminal to be scheduled resources is a reduced capability terminal 1403A or a conventional LTE terminal 1402A. In some examples this is achieved by analysing the random access request transmitted on the PRACH using the techniques to distinguish between a virtual carrier random access request and a conventional random access request as described above. In any case, when it has been determined at the adapted base station 1401A that a random access request has been made by a reduced capability terminal 1402A, the adapted scheduler 1409A is arranged to ensure that any grants of uplink resource elements are within the virtual uplink carrier.

The various elements and functionality of the communication cells 1404B and 1404C are in essence the same as for the communication cell 1404A. Accordingly the elements of communication cells 1404B and 1404C are similar to, and will be understood from, the above description of the corresponding elements of communication cell 1404A, and are not separately described here on the interest of brevity.

In some examples, the virtual carrier inserted within the host carrier can be used to provide a logically distinct "network within a network". In other words data being transmitted via the virtual carrier can be treated as logically and physically distinct from the data transmitted by the host carrier network. The virtual carrier can therefore be used to implement what might be called a dedicated messaging network (DMN) which is "laid over" a conventional network and used to communicate messaging data to DMN devices (i.e. virtual carrier terminals), for example classes of MTC devices.

Further Example Applications of Virtual Carriers

Having set out the concepts of virtual carriers of the kind described in co-pending UK patent applications numbered GB 1101970.0 [2], GB 1101981.7 [3], GB 1101966.8 [4], GB 1101983.3 [5], GB 1101853.8 [6], GB 1101982.5 [7], GB 1101980.9 [8] and GB 1101972.6 [9], GB 1121767.6 [10] and GB 1121766.8 [11], some extensions of the virtual carrier concept in accordance with embodiments of the invention are now described.

Figure 15:
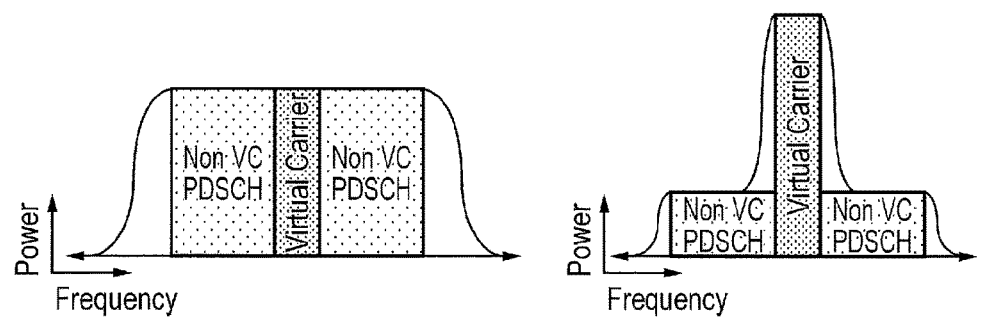
FIG. 15 schematically represents a maximum allowed transmission power as a function of frequency in a conventional wireless telecommunications system providing support for a virtual carrier as previously proposed (left-hand side of the figure) and in a wireless telecommunications system providing support for a virtual carrier in accordance with an embodiment of the invention (right-hand side of the figure)

As noted above, it is expected that terminal devices, such as machine type communication devices, which make use of virtual carriers might often be in locations with relatively high penetration loss as regards radio communications with a base station. For example, an MTC-type terminal device associated with a smart meter application may be located in a basement. This can mean certain devices using virtual carriers may require a base station to transmit with significantly higher power levels than for other terminal devices coupled to the base station in order to support reliable communications. To address this issue in accordance with embodiments of the invention a base station may be configured to transmit on frequencies comprising a virtual carrier (VC) at a higher power than on frequencies comprising a host carrier (i.e. on non-VC frequencies). The principles of this approach are schematically represented in FIG. 15. FIG. 15 schematically represents a maximum allowed transmission power as a function of frequency in a conventional wireless telecommunications system providing support for a virtual carrier as previously proposed (left-hand side of the figure) and in a wireless telecommunications system providing support for a virtual carrier in accordance with an embodiment of the invention (right-hand side of the figure). In the conventional wireless telecommunications system providing support for a virtual carrier as previously proposed the non-VC (i.e. host) PDCCH region (represented in light shading in FIG. 15) and the VC region (represented in dark shading in FIG. 15) of the frequency spectrum have the same maximum allowed power, resulting in a flat maximum power spectrum as represented in the left-hand side of FIG. 15. In practice, communications with specific terminal devices on specific subcarriers will be made with less power than the maximum allowed, taking into account the conventional power control mechanisms provided in wireless telecommunications systems.

However, in accordance with an embodiment of the invention, a base station is configured to allow a higher maximum transmission power for frequencies supporting a virtual carrier than for frequencies supporting the non-VC traffic. This is schematically shown to the right hand side of FIG. 15. Thus, the virtual carrier region (represented in dark shading in FIG. 15) of the frequency spectrum has a higher allowed transmission power than the non-VC (i.e. host) PDCCH region (represented in light shading in FIG. 15). This approach can therefore allow for more reliable communications with terminal devices supported by the virtual carrier and which might often be in "hard to reach" places, such as underground. One significant aspect of the maximum power spectrum represented in the right-hand side of FIG. 15 as compared to the more conventional approach represented in the left-hand side of FIG. 15 is that the overall maximum power that may be transmitted by the base station is the same in each case. That is to say, the areas under the curves on the left- and right-hand sides of FIG. 15 are in this example the same. A base station providing for enhanced maximum transmission power on a virtual carrier may be referred to herein as supporting a power boosted virtual carrier. The actual transmission powers used at each frequency may be determined in accordance with the principles of conventional power control techniques in wireless telecommunications systems, but in accordance with embodiments of the invention, this is subject to different maximum allowed powers depending on whether individual subcarriers are inside or outside the range of frequencies supporting the virtual carrier(s) in the wireless telecommunications network. A base station in accordance with certain embodiments of the invention may be configured to switch between the use of a power boosted virtual carrier (i.e. a virtual carrier having a higher maximum power than its host carrier as indicated to the right of FIG. 15) and a "normal" power virtual carrier (i.e. a virtual carrier having the same maximum allowed power as its host carrier as indicated to the left of FIG. 15) according to current requirements. For example there may be no need to adopt a power-boosted virtual carrier in subframes where the base station is not communicating with any terminal devices which require more power.

One issue with adopting a power boosted virtual carrier is an increase in the potential for intercell interference for the power boosted frequencies of the virtual carrier. This is especially likely if a neighbouring cell is also transmitting with a power boosted virtual carrier on overlapping frequencies. In order to help address this issue, the inventors have recognised that it can be helpful for a base station to convey information regarding is its virtual carrier transmissions, for example information such as the frequencies used for the virtual carrier and/or an indication of the maximum transmission powers that might be made on those frequencies, to neighbouring base stations. Neighbouring base stations may then take account of this information when scheduling their own use of virtual carriers. For example, a first base station may be configured to determine in accordance with its scheduling requirements that it should power boost a virtual carrier (i.e. the base station's transmission power budget should be concentrated on the virtual carrier frequencies for a period of time) and may proceed in accordance with an embodiment of the invention inform a neighbouring base station of this. The neighbouring base station may then schedule its own transmissions to avoid power boosting its own virtual carrier on overlapping transmission resources (e.g. overlapping in terms of time and frequency).

Figure 16:
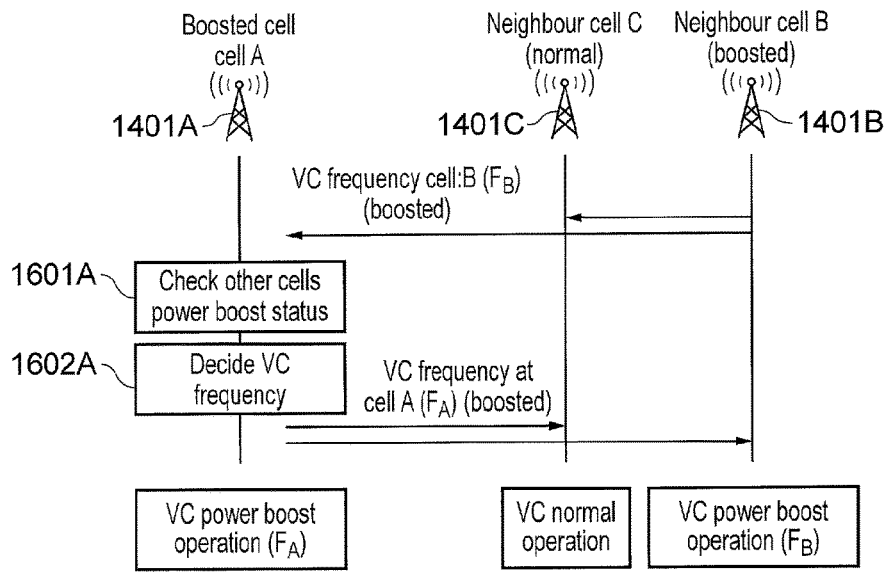
FIG. 16 is a signalling ladder diagram representing coordination among base stations with regards to virtual carrier transmissions in accordance with an embodiment of the invention.

FIG. 16 is a signalling ladder diagram representing coordination among base stations with regards to virtual carrier transmissions in accordance with an embodiment of the invention. The ladder diagram represents three base stations corresponding with the base stations 1401A, B, C represented in FIG. 14. Thus base station 1401A supports communications in a first cell, referred to here as cell A, while base stations 1401B and 1401C respectively support communications in second and third communication cells, referred to here as cell B and cell C. It is assumed here the signalling represented in the diagram starts from a point at which the base station of cell B has elected to focus its maximum allowed transmission power into a virtual carrier transmitted at a frequency $F_B$. It will be appreciated the virtual carrier will span a range of frequencies, and in this example it is assumed the bandwidth of the virtual carrier is fixed within the network and so the virtual carrier frequency range may be characterised by its centre frequency. Thus in the example of FIG. 16 it is assumed base station 1401B has previously determined that it intends to transmit a virtual carrier having a centre frequency $F_B$ with boosted power. In accordance with an embodiment of the invention, the base station 1401B is configured to provide signalling to base stations of neighbouring cells, in this example cells A and C, to indicate its intended power boosted virtual carrier transmissions at frequency $F_B$. This signalling is schematically represented in FIG. 16 by the top two arrows from cell B to cells A and C respectively. In an LTE-type network this signalling may be provided using the X2 interface provided for inter-base station communications. Further details on examples of how the signalling may be implemented are provided below.

In the following discussion of the signalling ladder diagram FIG. 16 it is assumed the base station 1401A in cell A also wishes to adopt power boosted transmissions on a virtual carrier, whereas base station 1401C in cell C does not need to adopt any power boosted transmissions. This may be, for example, because the base station 1401A has data for transmission to a terminal device which requires increased power, whereas base station 1401C does not have data for transmission to any terminal devices which require power boosting for an upcoming scheduling period. Some example ways in which a base station may determine whether it needs to make power boosted transmissions on a virtual carrier are discussed further below.

Thus, returning to FIG. 16, in step 1601A, the base station 1401A operating in accordance with an embodiment of the invention determines whether there are any neighbouring cells in which power boosting is in use. In accordance with example of FIG. 16, the base station 1401A will determine that base station 1401B intends to power boost a virtual carrier at frequency $F_B$ based on the signalling previously received from base station 1401B indicating the virtual carrier frequency of cell B which is to be boosted for a period of time. The period of time may be based on a fixed coordination cycle period, or may be variable and communicated between base stations as part of the information regarding a base station's intended upcoming use of power boosting.

In step 1602A, the base station 1401A operating in accordance with an embodiment of the invention determines its own virtual carrier frequency to be power boosted. This is done by selecting from available frequencies in accordance with the range of virtual carrier frequencies available in the network for the virtual carrier implementation at hand, while seeking to avoid overlapping with the virtual carrier frequency that another cell as indicated will be boosted. Thus, in the example of FIG. 16, the base station 1401A avoids power boosting on a virtual carrier frequency $F_B$, and instead selects another frequency, in this case $F_A$, as the centre frequency for its own virtual carrier transmissions for a coming period.

Having elected to concentrate its maximum allowed transmission power budget into a virtual carrier transmitted at a frequency $F_A$, the base station 1401A is configured to provide signalling to base stations of neighbouring cells, in this example cells B and C, to indicate its intended power boosted virtual carrier transmissions at frequency $F_A$. This signalling is schematically represented in FIG. 16 by the two arrows from cell A to cells B and C respectively. This signalling corresponds with the signalling sent from base station 1401B to be stations 1401A and 1401C earlier in the process when base station 1401B indicated an intention to transmit a virtual carrier on frequency $F_B$ with concentrated power. As mentioned above, in an LTE-type network this signalling may be provided using the existing X2 interface provided for inter-base station communications. Further details on examples of how the signalling may be implemented are provided below.

Having communicated its intention to make power boosted virtual carrier transmissions at frequency $F_A$ to the other base stations 1401B and 1401C, the base station 1401A proceeds to make transmissions with an increased maximum allowable power on a virtual carrier at frequency $F_A$ as compared to its transmissions at frequencies outside that of the virtual carrier at frequency $F_A$. In a similar manner, base station 1401B makes transmissions with an increased maximum allowable power on a virtual carrier at frequency $F_B$ as compared to its transmissions at frequencies outside that of the virtual carrier at frequency $F_B$, as it previously indicated it would do in the initial signalling of the ladder diagram of FIG. 16. The base station 1401C, having elected not to use any power boosting, may proceed with a non-power boosted ("normal") virtual carrier operating mode. In this example the frequency of the virtual carrier used by base station 1401C may be arbitrarily selected in accordance with this example embodiment based on the frequencies available for virtual carrier operation in the implementation at hand.

As noted above, the actual transmissions from the respective base stations may be made at powers which are controlled using the principles of conventional transmission power feedback techniques, albeit with different maximum allowed powers for frequencies falling within the respective virtual carrier transmissions of the base stations 1401A and 1401B. For example, it may be that one of the base stations indicating a desire to allocate a higher maximum allowed power to its virtual carrier transmissions in fact is able to communicate reliably with its terminal devices with relatively low power, for example because particularly good channel conditions happened to exist when the time to make the communications comes. In other examples each base station may be configured to always transmit at its maximum allowable transmission power for each frequency and to simply change coding rate according to channel conditions. For example, where channel conditions are particularly good, a higher coding rate may be used rather than a lower power. In such example implementations, what is referred to above as a maximum allowable transmission power may in fact be the actual transmission power.

Figure 17:
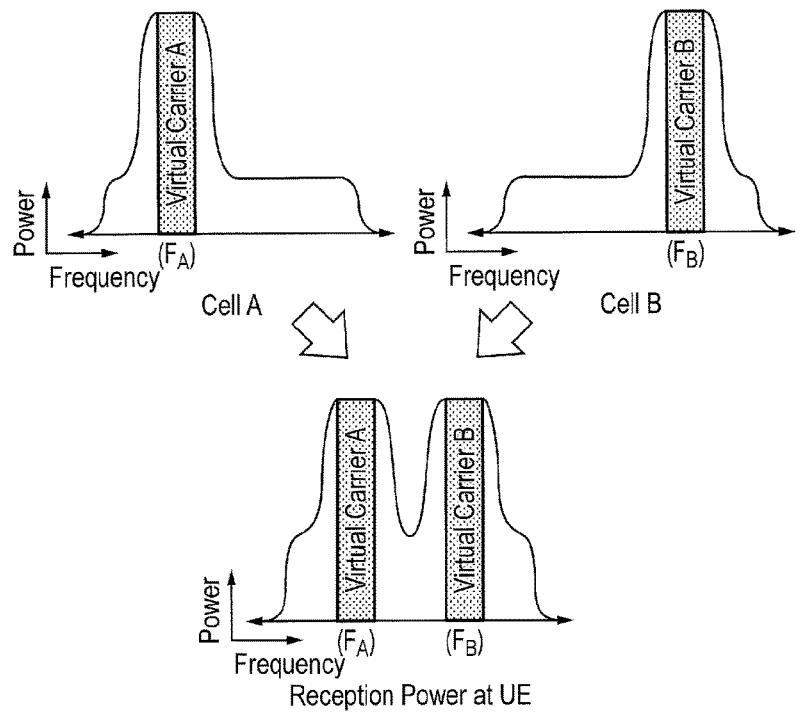
FIG. 17 schematically represents respective transmissions from two base stations in accordance with an embodiment of invention (top row in the figure) and the corresponding combined signal that might be seen by a terminal device in the vicinity of a boundary between the cells supported by the respective base stations (lower part in the figure)

FIG. 17 schematically represents the respective transmissions from the base station 1401A with power boosting on the virtual carrier at frequency $F_A$ (top left in the figure) and the base station 1401B (top right in the figure) with power boosting on the virtual carrier at frequency $F_B$ on the basis that transmissions are made at the maximum allowable transmission power for all frequencies. A combination of signals from base station 1401A and 1401B that might be seen by a terminal device in the vicinity of a boundary between the cells supported by the respective base stations is schematically shown in the lower part of FIG. 17. Because the power boosted virtual carrier associated with base station 1401A and the power boosted virtual carrier associated with base station 1401B are at different frequencies, they do not significantly overlap, thereby helping to reduce the impact of a power boosted virtual carrier in one cell from interfering with communications using a power boosted virtual carrier in neighbouring cell.

Thus, in accordance with certain embodiments of the invention, base stations in a wireless telecommunications system in which virtual carrier concept are adopted are configured to coordinate their use of the virtual carrier with one another. In particular, the respective base stations are configured to communicate information regarding their intended upcoming virtual carrier transmissions, and more particularly still, in accordance with certain embodiments the respective base stations are configured to inform neighbouring base stations of an intention to transmit a virtual carrier at an increased power compared to a host carrier, and in some cases to furthermore indicate what frequency the virtual carrier is to be transmitted by that base station. Conversely, base stations in accordance with certain embodiments of the invention are also configured to receive information from neighbouring base stations regarding characteristics of the neighbouring base station's intended use of a virtual carrier, and to determine characteristics of their own virtual carrier transmissions (e.g. frequency and use of power boosting) in a manner which takes account of this information received from neighbouring base stations.

In the example schematically represented in FIGS. 16 and 17 the neighbouring base stations coordinate through communications on the X2 interface to help ensure each base station selects a different frequency band in which to support a power boosted virtual carrier. However, it will be appreciated there are other characteristics of the respective base stations' use of virtual carriers which can be selected by individual base stations based on inter-base station coordination.

For example, FIG. 17 schematically represents one approach in which different base stations can coordinate to transmit their power boosted virtual carriers at different frequencies to reduce intercell interference arising from the potential higher powered transmissions on their respective virtual carriers. However, in accordance with another approach according to certain embodiments of the invention neighbouring base stations can coordinate to transmit power boosted virtual carriers at different times, instead of (or as well as) at different frequencies. For example, in some cases a wireless telecommunications system might only allow virtual carriers to exist at a single frequency (for example around a centre frequency of the host carrier bandwidth). In this case it may not be possible for neighbouring base stations to adopt different frequencies for their respective power boosted virtual carrier transmissions. Accordingly, neighbouring base stations may instead coordinate to agree different times (i.e. different subframes) during which they intend to adopt a power boosted virtual carrier. For example, a first base station in a first communication cell may determine that it needs to adopt a power boosted virtual carrier for a given number of subframes to meet its scheduling requirements, and may then indicate the particular times (subframes) on which its virtual carrier is to be boosted.

For example, the base station may communicate to other base stations using the X2 interface that it intends to apply power boosting to its virtual carrier in a particular range of subframes, may, for example for N subframes comprising every nth subframe starting from subframe X. If there is another base station neighbouring the first base station which also wishes to apply power boosting, it may then determine to do so during the subframes in which the first base station has not indicated it intends to apply power boosting. It will be appreciated the principles underlying this approach are similar to those set out above with regards to the base station selecting different frequencies for the virtual carriers, except the coordination among base stations is made with a view to avoiding overlap in the time domain, instead of the frequency domain. It will further be appreciated that in other examples, base stations may coordinate both in respect of their frequencies and times of transmission for their intended use of power boosted virtual carriers with a view to reducing intercell interference arising from two (or more) neighbouring base stations applying power boosting on the same time-frequency resource.

In cases where base stations are configured to coordinate is to avoid overlapping power boosted virtual carrier transmissions in the time domain, it may be that the coordination is made at a relatively fine temporal resolution, for example on a subframe by subframe basis, or it may be made on a more coarse temporal resolution, for example with individual base stations in effect reserving longer periods of time during which they intend to apply power boosting, for example reserving time periods corresponding to seconds, tens of seconds, or even longer.

Figure 18:
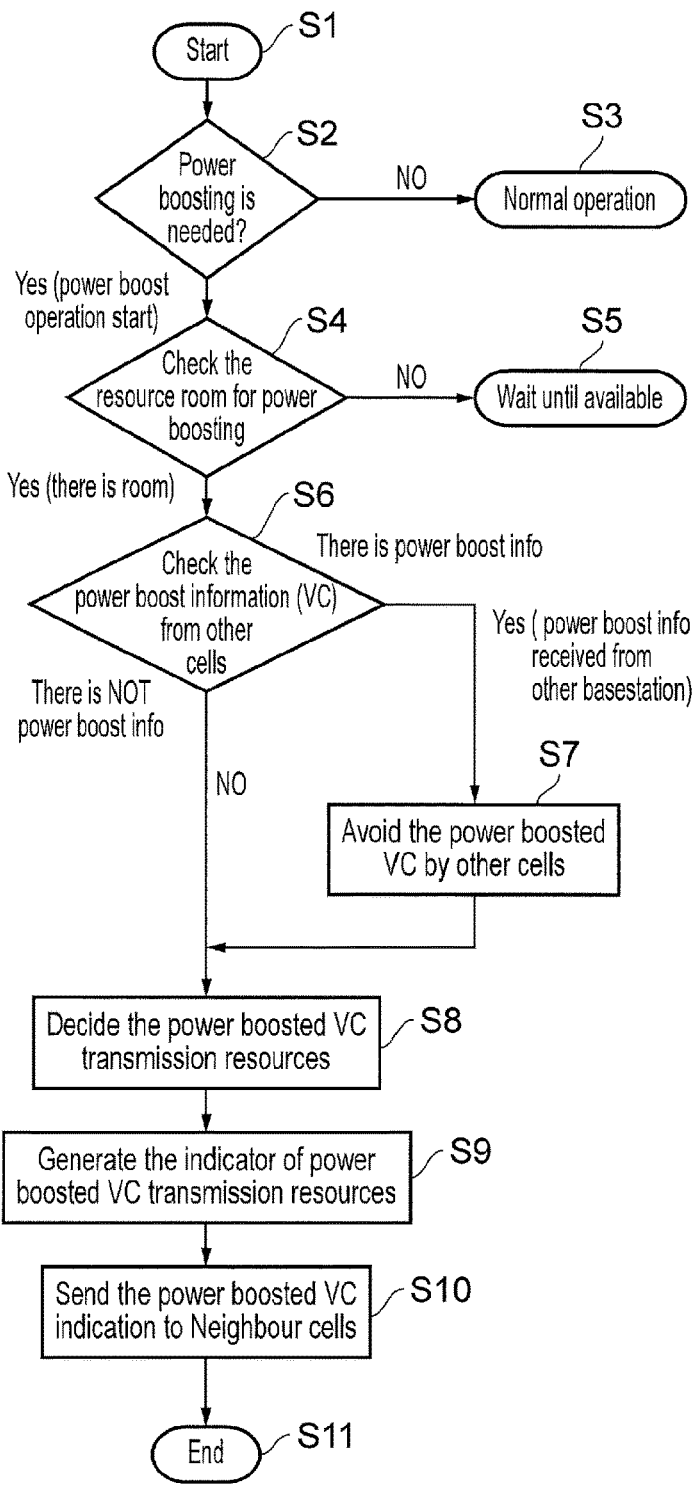
FIG. 18 is a flowchart schematically representing operating steps of a base station in accordance with an embodiment of the invention.

FIG. 18 is a flowchart schematically representing operating steps of a base station, for example, any one of the base stations 1401A, B, C represented in FIG. 14, in accordance with an embodiment of the invention. The processing represented in FIG. 18 begins in a first step S1. As discussed above, processing in accordance with embodiments of the invention is based on inter-base station coordination of characteristics relating to virtual carrier transmissions associated with respective base stations in a wireless telecommunications system. In principle, with appropriately fast signalling between base stations, coordination could be performed on a per-frame basis, or perhaps even a per-subframe basis. However, in practice it may be considered more appropriate for each base station to establish characteristics associated with its virtual carrier transmissions for a longer period, and to exchange coordination signalling in association with each such period, which might be referred to as a coordination period. For example, in one example a coordination period might comprise 40 frames. Thus, step S1 in FIG. 18 might correspond with the beginning of such a coordination period for the base station at hand.

Thus, in step S2 the base station determines whether power boosting is needed for the next period (i.e. the next upcoming coordination period), whatever might be (e.g. a subframe, a frame, or a predefined number of subframes/frames). This determination may be made by taking account of which terminal devices the base station is serving which may require power boosted virtual carrier transmissions, for example because one or more terminal devices is in a poor coverage area, and whether the base station has data for transmission to any such terminal devices. Whether or not the base station has (or will have) data for transmission to a particular terminal in the upcoming coordination period may be determined in accordance with the base station's conventional scheduling operations. Whether or not a particular terminal device is one which requires power boosted virtual carrier transmissions may be determined in a number of ways, as discussed further below.

If in step S2 it is determined that power boosting is not needed, for example because there is no data to be transmitted to any terminal devices reliant on power boosted virtual carrier transmissions, processing may proceed from step S2 along the branch marked "no" to step S3. In step S3 the base station proceeds to operate normally without any virtual carrier power boosting.

If, on the other hand, in step S2 it is determined that power boosting is needed, for example because the base station intends to transmit data to a terminal device which is in a poor coverage area in the coming period, processing follows the "yes" branch from step S2 to S4.

In step S4 the base station determines whether it has sufficient free resource availability to introduce power boosting on a virtual carrier in the upcoming coordination period. For example, if the base station is also required to support communications with a number of other terminal devices in the upcoming coordination period, for example conventional terminal devices served on a host carrier transmitted in parallel with the virtual carrier, it may be that the base station cannot afford to reduce the power of transmissions on the host carrier to allow boosted transmissions on the virtual carrier. For example, it may be that the base station needs to maintain normal transmission powers on the host carrier to support the devices served by the host carrier.

If in step S4 it is determined that the base station does not have sufficient resource availability to allow it to concentrate transmissions on the virtual carrier because of the impact on the host carrier, processing may proceed from step S4 along the branch marked "no" to step S5. In step S5 the base station proceeds to operate normally without any virtual carrier power boosting for the upcoming coordination period to ensure devices other than the terminal device(s) requiring power boosted transmissions can be properly supported. The terminal device require power boosting will thus not receive any schedule transmissions in the upcoming coordination period. In effect, the base station is configured to wait to communicate with the terminal device requiring power boosting until such time as the base station can support power boosting on the virtual carrier without undue impact on other terminal devices being served. In this case the base station may be configured to in effect operate normally (i.e. without virtual carrier power boosting) for the current coordination period and to return to step S1 so that the steps S1 to S4 can be repeated for the next coordination period. This approach may lead to delays in communications with terminal devices requiring power-boosted transmissions. However, in many cases it is expected that devices operating on a virtual carrier may be relatively delay tolerant such that the delays caused by step S5 do not represent a significant problem in practice. In some cases the base station may be configured to continue iterating through steps S1 to S5 to cause repeated waiting periods in respect of particular transmissions for a particular terminal device until a threshold number waiting periods (iterations through steps S1 to S5) is reached, and then the base station may be configured to proceed to allocate power boosted resources for communications with the terminal device even at the cost of reduced performance for other terminal devices. That is to say, the base station may be configured after a given number of iterations through steps S1 to S5 without making transmissions that are needed for a particular terminal device to avoid following the "no" branch from step S4 to S5, even if the base station concludes that adopting power-boosted transmissions for the particular terminal device will impact the service provided to other terminal devices. This approach may be appropriate to avoid a terminal device requiring power boosted transmissions from not receiving any transmissions for what is considered to be too long a period (what is considered too long a period which will depend on the implementation at hand and the extent to which the transmissions are delay tolerant).

If in step S4 it is determined that the base station has sufficient resource headroom available to allow it to concentrate its power budget into power boosted transmissions on a virtual carrier without causing what is considered too much detrimental impact on other terminal devices in the network, processing follows the "yes" branch to step S6. The decision on what is considered to be an acceptable detrimental impact on other terminals in the network will depend on the implementation at hand, and the devices that are being served. For example, by taking account of quality of service requirements associated with the respective terminal devices. As noted above, in accordance with some embodiments, processing may proceed from step S4 to step S6 even if it is determined in step S4 that virtual carrier power boosting in the upcoming period will cause a significant detrimental impact on other terminal devices, for example because a terminal device which requires power boosting has already been waiting for too long to receive data (i.e. there have already been too many iterations through S1 to S5 in association with pending transmissions for a particular terminal device).

In step S6 the base station is configured to determine whether it has received information from any other base stations indicating their intention to apply virtual carrier power boosting during the upcoming coordination period. That is to say, the base station is configured to determine whether it has received any communications such as those schematically represented by the top two signalling arrows in FIG. 16 and discussed above.

If in step S6 it is determined that no virtual carrier power boost information has been received from any other base stations in association with the upcoming coordination period, processing follows the branch marked "no" to step S8, discussed further below.

If, on the other hand, it is determined in step S6 that virtual carrier power boost information has been received from another base station, processing follows the branch marked "yes" to step S7.

As discussed above, virtual carrier power boost information received from a neighbouring base station may comprise an indication of characteristics associated with the neighbouring base station's upcoming intended virtual carrier transmissions. More specifically, in accordance with certain embodiments the power boost information may comprise an indication of which transmission resources (in terms of frequencies and/or times) the neighbouring base station intends to use for its power boosted virtual carrier transmissions. The base station implementing the processing of FIG. 18 is configured to avoid using the transmission resources that the neighbouring base station has indicated will be used by the neighbouring base station for power boosted virtual carrier transmissions. For example, if the neighbouring base station has indicated it intends to apply virtual carrier power boosting as discussed above to transmissions on resources corresponding to a particular frequency range throughout the upcoming coordination period, the base station implementing the method of FIG. 18 is configured to in effect consider those transmission resources as having been reserved by the neighbouring base station for virtual carrier transmissions.

In step S8 the base station proceeds to determine which transmission resources it intends to use for the transmissions that were established as being needed for the upcoming coordination period in step S2. As has previously been proposed for virtual carriers in wireless telecommunications systems, a wireless telecommunications system might be configured to support virtual carrier transmissions on a predefined number of fixed frequencies. For example, in accordance with one example virtual carrier implementation in a given wireless telecommunications system, it may be established that base stations may only adopt virtual carrier transmissions within four predefined frequency bands such as represented in FIG. 10 discussed above. In such a system, the processing in step S8 corresponds with selecting one of the allowed virtual carrier frequency bands to adopt for power boosted transmissions. However, in other examples, a wireless telecommunications system may be configured in such a way as to allow individual base stations to arbitrarily select the frequencies they are to use for virtual carrier transmissions from anywhere within the overall system bandwidth. In this case, the processing in step S8 corresponds with the base station selecting a frequency band from anywhere within the system bandwidth.

However, regardless of the range of transmission resources that are made available in the wireless telecommunications systems for potential virtual carrier transmissions by the respective base stations, in accordance with embodiments of the invention the base station selects transmission resources for its own upcoming power boosted transmissions in step S8 in a manner which avoids overlap with transmission resources deemed to have been already reserved by other base stations in step S7 based on previously-received power boost information identified in step S6. For example, as discussed above with reference to FIG. 16, if the wireless telecommunications system supports virtual carrier operation centred on two frequencies, $F_A$ and $F_B$, and a neighbouring base station has previously indicated it intends to use the virtual carrier comprising frequencies centred on $F_B$ for power boosted transmissions, the base station implementing the processing of FIG. 18 may be configured in step S8 to avoid selecting these frequencies, and to instead selects the virtual carrier frequencies centred on $F_A$ for its own power boosted virtual carrier transmissions for the upcoming coordination period.

Having selected in step S8 the transmission resources to be used for the virtual carrier power boosted operation in the upcoming period, the base station is configured to generate an indication of these transmission resources (in step S9) and to communicate this indication to other base stations (in step S10). For example, the other base stations may comprise base stations which are geographically adjacent, or near to, the base station, such that there is a possibility of intercell interference associated with transmissions from the respective base stations. Such other base stations might be referred to generally as neighbouring base stations.

Having selected transmission resources to be used for virtual carrier power boosted operation (step S8), and having generated and communicated an indication of these transmission resources to at least one other base station (steps S9 and S10), the processing represented in FIG. 18 proceeds to completion in step S11.

Thus, having reached step S11, the base station has identified that power boosting is needed for an upcoming period (step S2), determined that resources are available within the cell served by the base station to support power boosted virtual carrier operation (step S4), selected transmission resources to use for the power boosted virtual carrier operation in a manner which avoids overlap with transmission resources which neighbouring base stations have indicated they intend to use for power boosted virtual carrier operation (step S8), and communicated an indication of the transmission resources to at least one other base station (step S10).

Having done this, the base station may proceed to schedule transmissions for the relevant period accordingly. For example, the base station may operate in a generally conventional manner apart from adopting a maximum allowed transmission power profile such as schematically represented to the right hand side of FIG. 15, with the virtual carrier location being based on the selected transmission resources.

Thus, in accordance with embodiments of the invention a base station is able to coordinate with neighbouring base stations to select transmission resources for power boosted virtual carrier transmissions in a manner which can help to avoid intercell interference which might arise if neighbouring base stations both apply virtual carrier power boosting in accordance with embodiments of the invention on overlapping transmission resources.

The above-described example has primarily focused on using inter-base station signalling/coordination to avoid simultaneous virtual carrier operation by neighbouring base stations on the same frequencies through different base stations selecting different frequencies for their virtual carrier transmissions. However, it will of course be appreciated that embodiments of the invention may equally (or additionally) operate by using inter-base station signalling/coordination to avoid simultaneous virtual carrier operation by neighbouring base stations on the same frequencies through different base stations selecting different timings for their virtual carrier transmissions which might be on the same frequency.

For example, in one implementation a wireless telecommunications system might allow for only a single virtual carrier frequency band, for example at the centre of a host/system bandwidth. In this case it would not generally be possible for different base stations to select different frequencies to avoid overlapping power boosted virtual carrier transmissions. Accordingly, the base stations may instead coordinate to exchange information relating to particular times in which they intend to apply power boosting to the virtual carrier transmissions. For example, with reference to the processing represented in FIG. 18, the information relating to intended virtual carrier power boost operation received from other base stations in step S6 and communicated to other base stations in step S10 might comprise an indication of which times the respective base stations are intending to adopt power boosting. For example, if in a step corresponding to step S6 of FIG. 18 a base station receives an indication that a neighbouring base station intends to adopt power boosted virtual carrier operation in a particular series of upcoming subframes, the base station may determine in a step corresponding to step S8 to select different subframes for its own virtual-carrier power boosted operation to avoid an overlap in transmission resources. Thus, the power boosted virtual carrier indication sent to neighbouring cells in a step corresponding to step S10 of FIG. 18 may comprise an indication of which subframes are intended for power boosted virtual carrier operation by the base station, thereby allowing other base stations to take account of this when selecting their own transmission resources should they require power boosted virtual carrier operation in the relevant timeframe.

More generally, it will thus be appreciated that references to selecting transmission resources should be interpreted as selecting from available time and/or frequencies on which virtual carrier transmissions might be made in accordance with the specific virtual carrier implementation for the wireless telecommunications system.

In some embodiments both time and frequency may be used to characterise intended virtual carrier transmissions by other base stations. For example, a base station may receive an indication from a neighbouring base station that the neighbouring base station intends to apply power boosting to virtual carrier transmissions on a particular frequency and at particular times. The base station receiving such an indication and wishing to select its own transmission resources for power boosted virtual carrier transmissions may select from non-reserved times and frequencies to avoid overlap. In this regard, in some cases it may be preferable seek to avoid overlapping transmission resources by preferably selecting different times, rather than different frequencies. This approach can help a base station reduce the number of times it changes its virtual carrier frequency as compared to what might otherwise be required if overlap were primarily avoided through selection of a different frequency. In some cases this can be advantageous because switching virtual carrier frequency may lead to increased signalling overhead and the introduction of delays while the new virtual carrier frequency is adopted within the communication cell supported by the base station.

As noted above, there are various ways in which a base station might implement step S2 in FIG. 18 to determine that there are terminal devices requiring power boosted operation in an upcoming period. Whether or not an individual terminal device requires scheduling in an upcoming period may be determined in accordance with the conventional base station scheduling operations. However, a supplementary issue to be considered in step S2 in accordance with some embodiments of the invention is whether any of the terminal devices which are to be scheduled are terminal devices which require power boosted transmissions.

In some examples the status of particular terminal devices as being devices requiring power boosting may be pre-configured in the wireless telecommunications system. For example, the base station may simply be provided with identities of terminal devices which might require power boosting. Thus, the base station may be simply provided with a lookup table of all devices within its coverage area which are defined as being devices requiring power boosting on the virtual carrier for reliable communications. This approach may be appropriate where there is low mobility among devices. Low mobility is expected to be a typical characteristic of certain classes of machine type communication devices. Thus, when a new terminal devices installed in a particular location having a high propagation loss, for example a basement, a corresponding entry may be made in a lookup table at the base station supporting the location of the terminal device. When the base station comes to schedule transmissions to devices in accordance with its normal scheduling operation, it may be configured to refer to the lookup table to determine whether any of the terminal devices to be scheduled for transmissions are classified as devices for which power boosted virtual carrier transmissions should be adopted.

In other examples there may be a mechanism for configuring individual terminal devices according to their status as a device requiring power boosted transmissions. For example, software flag(s) or other settings, such as dip switches/jumpers, may be configured for a particular terminal device to be identified as one requiring power boosted virtual carrier transmissions. A connection procedure for terminal devices in the wireless telecommunications network may thus be modified to include a step of communicating an indication that the terminal device requires power boosted virtual carrier operation based on this configuration setting at the terminal device. For example, a terminal device may establish that it is associated with a particular terminal device capability/category based on such configuration settings, and communicate this to the base station through radio resource control (RRC) signalling or communicate the information to the core network of the wireless telecommunications system using NAS (Non-Access Stratum i.e. core network) signalling.

Figure 19:
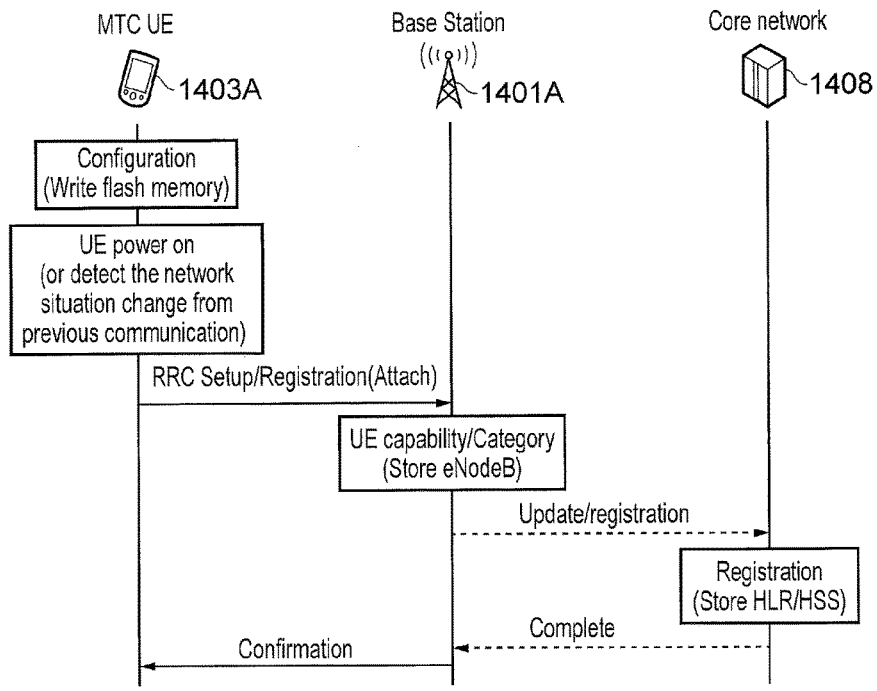
FIGS. 19 to 22 are signalling ladder diagrams schematically representing some example approaches for establishing whether a terminal device might benefit from power boosted virtual carrier operation in accordance with an embodiment of the invention.

This approach is schematically represented in the signalling ladder diagram of FIG. 19. FIG. 19 represents signalling in accordance with an embodiment of the invention between an MTC type terminal device 1403A, a base station 1401A, and a core network 1408, for example of the kind represented in FIG. 14. Working from the top down, in a first step configuration settings are made for the terminal device 1403A to identify it as a terminal device requiring power boosted transmissions to support reliable communications. This configuration may be set, as discussed above, in software, or in hardware, for example during installation of the terminal device in its particular location.

In a second step the terminal device powers on (or otherwise detects a network situation has changed from the previous communication) so as to initiate an RRC setup/registration (attach) procedure in accordance with generally conventional techniques. In accordance with this example embodiment, the terminal device is configured to communicate at this stage an indication of its status as a device requiring power boosted transmissions. The base station 1401A receives the RRC signalling and makes a record of the terminal device capability/category defining it as a terminal device requiring power boosted transmissions. The base station 1401A may proceed to send signalling to the core network 1408 if it is desired to register status information regarding the terminal devices requirements for power boosted virtual carrier operation the core network, and if so, the core network 1408 may provide an indication ("complete" message) to the base station 1401A to indicate this has been done. In accordance with this example, the base station further sends confirmation signalling to the terminal device 1403A to confirm the status of the terminal device as a device requiring power boosted operation has been recorded in the network.

This type of pre-configuration approach provides a relatively straightforward mechanism for identifying which terminal devices require power boosted transmissions in a given communication cell. However, in some other examples terminal devices may be identified as terminal devices requiring power boosted transmissions using other techniques that do not rely on an initial configuration. These types of approach may be more appropriate, for example, for a terminal device which may move from an environment in which power boosted transmissions are required to an environment in which power boosted transmissions are not required. In such circumstances it may be helpful for a terminal device to be able to identify its changing status in this regard through signalling.

Thus, a terminal device may be operable to establish whether it is in a situation which requires power-boosted transmissions in accordance with embodiments of the invention in order to support reliable communications. In general, this may be based on a terminal device making a measurement on the extent to which it is able to receive base station transmissions, and to report back to the base station if the measurement indicates power boosting would be advantageous (because it would otherwise be difficult for the terminal device to reliably receive base station transmissions). In accordance with this approach, a terminal device may make measurements of the coverage it is receiving based around existing mechanisms, such as those established in LTE-type wireless telecommunications systems for channel quality indicator (CQI) and pathloss reporting.

Figure 20:
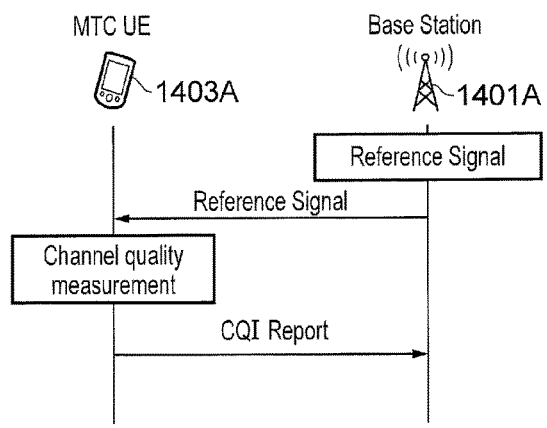

An approach based around existing CQI schemes is schematically represented in the signalling ladder diagram of FIG. 20. FIG. 20 represents signalling in accordance with an embodiment of the invention between an MTC type terminal device 1403A and a base station 1401A, for example of the kind represented in FIG. 14. Working from the top down, in a first step the base station 1401A determines a reference signal to be transmitted. In a second step the base station 1401A transmits the reference signal, and it is received by the terminal device 1403A. From the received reference signal the terminal device 1403A establishes a channel quality measurement. This may be performed in accordance with generally conventional CQI measurement techniques for the reference signal received. In a next step, the terminal device 1403A transmits a channel quality indicator (CQI) report to the base station 1401A. This may again be performed in accordance with generally conventional CQI reporting techniques in LTE-type wireless telecommunications systems. Having received the CQI report, the base station may determine from the quality of the channel received by the terminal device whether or not the terminal device is in a location which requires power boosting due to poor channel quality conditions.

Conventional CQI reporting in LTE-type wireless telecommunications systems employs so-called cell specific reference signals (CRS). However, in some cases reception of CRS may not be reliable in poor coverage areas. Thus, a terminal device in a situation which would benefit from power boosting in accordance with an embodiment of the invention may not be able to reliably receive CRS. Thus, in accordance with some embodiments, alternative reference signals or other equivalent signals may be employed for CQI-type reporting. For example, the existing DM-RS (de-modulation reference signal) or CSI-RS (channel state information reference signal) may be employed in LTE-based systems. The power settings for these reference signals can be set differently for different terminal devices, thereby allowing the base station to transmit these reference signals with more power than CRS. In principle a base station may be configured to transmit CRS at higher power to increase the likelihood of successful reception by terminal devices in poor coverage areas. However, in practice this may cause interoperability issues for older conventional terminal devices which might be operating in the wireless telecommunication system and which are expecting to see conventional CRS signals. In other examples, synchronization signalling, for example conventional LTE primary or secondary synchronisation signalling (PSS/SSS), may be treated as reference signals for the purpose of measuring channel conditions in respect of received signal strength.

In still other examples, a new type of reference signal may be defined for the purpose of establishing whether terminal devices require power boosting. For the sake of convenience this may be referred to here as power boost reference signals/signalling. The characteristics of power boost reference signals might be configured so as to increase the likelihood of reliable reception by terminal devices in poor coverage areas (i.e. the areas where the virtual carrier power boosting in accordance with an embodiment of the invention is likely to be beneficial).

Thus, power boost reference signalling may, for example, be transmitted in subframes in which a base station is transmitting a power boosted virtual carrier. In this regard, the reference signalling might readily be transmitted with increased power (relative to non-power boosted transmissions in the wireless telecommunications system) to improve the likelihood of reliable detection. In this regard the power boost reference signalling may be transmitted with a higher power than, for example, cell specific reference signals (CRS). The power boosted reference signals may be positioned within the subframe with a predefined timing offset relative to synchronisation signals, thereby allowing terminal devices to readily monitor the appropriate timing in the subframe to seek to detect the power boost reference symbol. Furthermore, power boost reference signalling may be transmitted on frequencies within the virtual carrier frequency bandwidth. However, in other cases the power boost reference signalling may be transmitted elsewhere, for example on host-carrier frequencies. In any event, it may be helpful for power boost reference signalling to be transmitted on pre-defined frequencies to aid detection by terminal devices. It may be expected that terminal devices for which virtual carrier operation is appropriate might frequently be deployed with relatively low mobility. In this case, power boost reference signalling may be less frequent than conventional reference signalling, such as CRS. Furthermore, because the terminal devices for which virtual carrier operation is appropriate might frequently be associated with delay-tolerant communications, power boost reference signalling may be transmitted in a discontinuous manner. For example, power boost reference signalling may be transmitted for 1 minute every 15 min, or according to some other duty cycle according to the implementation at hand. Similarly, in some implementations virtual carrier power boosting might be applied only during periods of low network activity, for example during what might be termed quite times, such as during the night or early hours of the morning. In this case, power boost reference signalling might correspondingly be transmitted only during those times when virtual carrier power boosting may be active.

In situations where penetration loss between a base station and a terminal device is particular the high, conventional-type L1 CQI report signalling may not have sufficient gain to compensate for the past loss. In order to address this, conventional uplink coverage improvement techniques, for example those based on repetition, bundling and/or coding gain, may be applied in respect of a terminal device's CQI report signalling.

Such CQI reporting might follow the generally established techniques, but with a border range of potential reported values to accommodate the situation of a terminal device reporting that it is in an area where virtual carrier power boosting may be beneficial. For example, conventional CQI reporting may be based around a value range of 0-15. The CQI reporting value zero indicates a terminal device is out of coverage. A terminal device which may require virtual carrier power boosting may thus be configured to report CQI values over an extended range. For example, the addition of a single bit to indicate negative values may be used to allow a terminal device to in effect extend the available range of CQI values to −15 to +15, with negative values indicating the terminal device requires power boosting.

As noted above, an alternative approach for identifying terminal devices as potentially benefiting from power boosted virtual carrier operation may be based on past loss measurements. Reference signal received power (RSRP) is an existing concept in LTE-type wireless telecommunications systems and is defined as the linear average over the power contributions of the resource elements that carry cell-specific reference signals within a considered measurement frequency bandwidth. RSRP is the basic measurement for conventional pathloss calculations.

Figure 21:
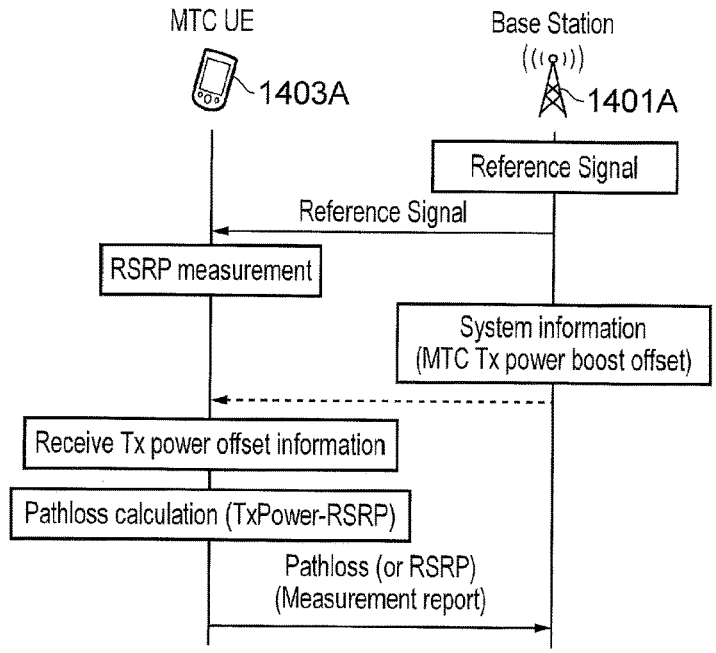

An approach based around existing path loss calculation schemes is schematically represented in the signalling ladder diagram of FIG. 21. FIG. 21 represents signalling in accordance with an embodiment of the invention between an MTC type terminal device 1403A and a base station 1401A, for example of the kind represented in FIG. 14. Working from the top down, in a first step the base station 1401A determines a reference signal to be transmitted. In a second step the base station 1401A transmits the reference signal, and it is received by the terminal device 1403A. From the received reference signal the terminal device 1403A establishes a RSRP measurement. This may be performed in accordance with generally conventional RSRP measurement techniques for the reference signal received. As for the above-described examples based on CQI reporting, the reference signalling employed in the example of FIG. 21 might be CRS or alternative reference signalling such as for the examples discussed above.

To determine pathloss from RSRP a terminal device needs an indication of the power which with which the reference signal was transmitted. Thus, the base station is configured to transmit system information regarding the transmission power for the reference signalling, as schematically indicated in FIG. 21 in the two stages following the RSRP measurement by the terminal device. If the reference signal is transmitted by the base station with increased power in power boosted virtual carrier subframes relative to its transmissions in non-power boosted virtual carrier subframes (to be received by conventional terminal devices), the base station may also communicate an indication of this offset. That is to say, the base station's indication of the transmitted signal strength may correspond with an indication of the reference signalling transmission strength in non-power boosted subframes along with an indication of an additional power offset associated with power boosted subframes. Thus, the terminal device can establish the transmission power associated with the reference signal for which the RSRP measurement is made, and determine the path loss in accordance with generally conventional techniques. In a final step of the process schematically represented in FIG. 21, the terminal device 1403A transmits a pathloss (or RSRP) report to the base station 1401A. This may again be performed in accordance with generally conventional RSRP reporting techniques in LTE-type wireless telecommunications systems. Having received the pathloss/RSRP report, the base station may determine from the reported power/pathloss received by the terminal device whether or not the terminal device is in a location which would benefit from virtual carrier power boosting. In an alternate approach there may be no broadcasting of transmission power boost information by the base station. In this case, the terminal device may send an RSRP report in the normal way, and the base station may then calculate an actual pathloss based on its own knowledge of the transmission power for the reference signal on which the terminal device's report is based.

Figure 22:
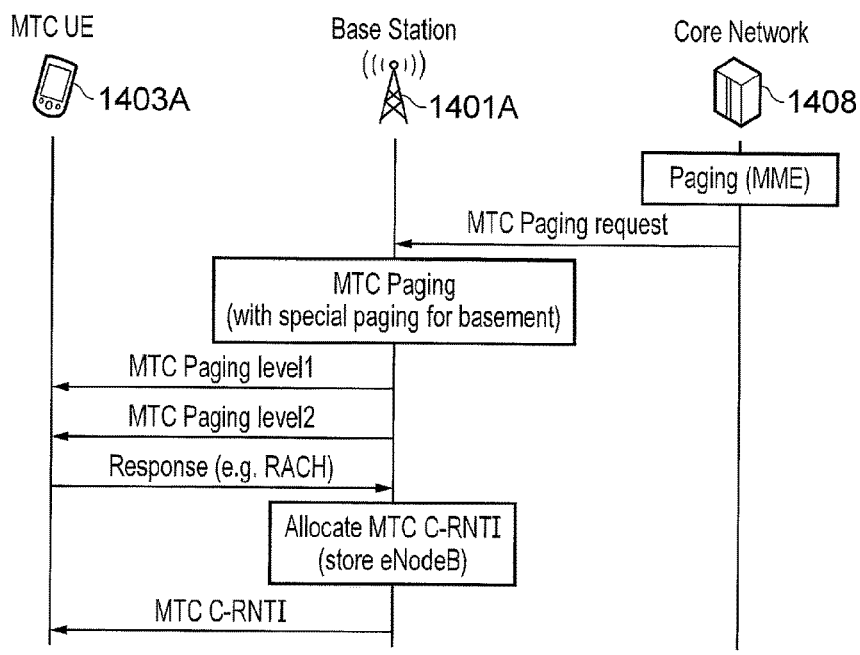

Yet another example mechanism for establishing whether a terminal device is one which would benefit from virtual carrier power boosted operation may be referred to as a paging-based approach. An example of this approach is schematically represented in the signalling ladder diagram of FIG. 22. FIG. 22 represents signalling in accordance with an embodiment of the invention between an MTC type terminal device 1403A, a base station 1401A, and a core network 1408, for example of the kind represented in FIG. 14.

Working from the top down in FIG. 22, in a first step an MME element of the core network 1408 initiates a paging procedure by sending a paging request to the base station associated with the MTC terminal device 1403A. On receiving the paging request from the core network element 1408, the base station 1401A initiates terminal device paging in accordance with an embodiment of the invention. In a broad summary, the technique involves the base station sending a sequence of paging messages with increasing gain until a response is received from the terminal device.

Thus, referring again to the signalling represented in FIG. 22, the base station first sends to the terminal device a conventional-type paging message with a first transmission power, referred to in FIG. 22 as level 1 paging. If no response is received from the terminal device, as in the example represented in FIG. 22, the base station is configured to send a second conventional-type paging message having a higher power, referred to in FIG. 22 as level 2 paging. The base station may repeatedly send paging messages with increasing gain (e.g. increasing power) until an appropriate response from the terminal device is received, for example a response of the type conventionally expected in response to a paging message. In the example of FIG. 22 it is assumed the second level paging message (MTC paging level 2) has sufficient transmission power to be received by the terminal device, and so the terminal device provides an appropriate response, for example on a random access channel.

On receiving the response, the base station can allocate the terminal device a temporary ID, e.g. a cell radio network temporary identifier (C-RNTI) in accordance with broadly conventional paging techniques, and communicate this to the MTC terminal device. Furthermore, based on the transmission power of the paging signal to which the terminal device responded, the base station can establish whether or not the terminal device is in a location associated with a penetration loss which would mean power boosting would be advantageous.

In order to extend the paging channel coverage, various techniques may be applied. In current LTE systems the paging signalling is transmitted by PDCCH. One simple way of implementing the above-described multi-level paging technique would be sequentially increasing the power of PDCCH transmissions. For example, a power offset from an original (baseline) power maybe adopted in a series of steps (e.g. 0, 3, 6 dB).

In some examples there may not be sufficient headroom available for the base station to increased power in this way. In this case, other techniques for in effect obtaining transmission gain of the paging channel may be adopted. Such techniques include, for example, beamforming gain, soft combining gain, and repetition/channel coding gain.

Beamforming gain may be provided with paging signalling by E-PDCCH (Enhanced Physical Downlink Control Channel) instead of PDCCH. E-DPCCH supports beamforming, which is useful for coverage extension because there is beamforming gain (direction gain). In some circumstances it may be inappropriate to use a beamforming gain approach for the paging channel because of terminal device mobility meaning the base station may not be fully aware of the position of the terminal device before paging. However, for the MTC-type terminal devices with low mobility, for example because they are installed at a fixed location, this will not be an issue.

For a soft combining gain approach paging may use a MBSFN support channel such as PMCH (Physical Multicast Channel). In accordance with this approach a new paging channel may be introduced into the MBSFN subframe to allow the transmission of a paging signal simultaneously among cells by using soft combining (coherent receiving). MBSFN is relatively simple to adopt in a SFN (single frequency network) and different delays from multiple cells can be accommodated by using a long CP (cyclic prefix)

For a repetition/channel coding gain approach there may be paging by the same channel as for current paging (PD-CCH), but the functionality may be extended for additional gain. For example, in PDCCH coverage depends on the CCE (Control Channel Element) aggregation level. One way to increase gain is for the CCE aggregation level to be extended beyond the current maximum value (e.g. the current maximum CCE aggregation size is 8, so, for example a maximum CCE size of 12 or 16, could be used instead). An alternate way is to provide for some data repetition, for example repeating paging over more than 1 sub frame.

Thus, to summarise multi-level MTC paging approaches of the kind schematically represented in FIG. 22, multiple levels of paging are introduced to help the base station determining a path loss level (based on what level of paging is eventually received by the terminal device). A first level (paging level 1) may correspond with a conventional paging message with no additional gain. This might correspond with the paging level expected to be appropriate for a conventional LTE device, for example. A second level (paging level 2) might be associated with a first step increase in gain (e.g. by power boosting transmissions by 3 dB, providing for repetition over 2 subframes, or increasing to 12 the number of CCEs for aggregation). A third level (paging level 3) might be associated with a further step increase in gain (e.g. by power boosting transmissions by 6 dB, providing for repetition over 3 subframes, or increasing to 16 the number of CCEs).

As noted above, a significant aspects of certain embodiments of the invention is that base stations in a wireless telecommunications system may exchange signalling messages relating to their intended adoption of potential enhanced/increased power transmissions on frequencies associated with a virtual carrier as compared to other frequencies transmitted by the base station. A convenient interface for supporting such inter-base station communications in a LTE-type system is the established X2 interface provided for inter-base station communications. However, it will nonetheless be appreciated that in accordance with other embodiments, other techniques for supporting inter-base that signalling may be provided.

As explained above, conventional LTE networks may support the soft frequency reuse ICIC technique. In accordance with this technique there is defined the Relative Narrowband Transmit Power (RNTP) information element (IE) which may be exchanged using X2 signalling along with an RNTP threshold IE in a so-called load information message. Conventional RNTP signalling comprises a series of bits corresponding with respective resource blocks (RBs) of a wireless telecommunications system bandwidth. The base station communicating RNTP signalling to a neighbouring base station over at the X2 interface sets the respective bits of the RNTP IE to indicate whether or not the corresponding resource block might be transmitted by the base station in the upcoming period (i.e. the period for which the RNTP signalling remains valid) with a power which exceeds the threshold power defined in the RNTP threshold IE. Further information regarding conventional RNTP signalling can be found in the relevant standards. Example, see 3GPP TS 36.423 version 11.2.0 (Release 11) [16]. In accordance with certain embodiments of the invention an adapted form of RNTP may be adopted as a format with which base stations coordinate their intended power boosted virtual carrier transmissions.

Thus, in one example base stations operating in accordance with embodiments of the invention may communicate information regarding their intended use of power boosted virtual carrier transmissions (for example in association with steps S4 and S10 of FIG. 18) by exchanging signalling similar to existing RNTP signalling. During power boosting a base station can adopt significantly different power transmissions for different OFDM subcarriers depending on whether the respective subcarriers are inside or outside the virtual carrier bandwidth. Accordingly, it may be appropriate for different RNTP thresholds to be set for virtual carrier and non-virtual carrier transmissions. Thus, in accordance with certain embodiments of the invention, a new information element may be defined for X2 signalling to identify a different threshold for virtual carrier power boosted transmissions. This information may be conveniently referred to here as a power boost Relative Narrowband Transmit Power threshold IE.

In current LTE-type systems the RNTP threshold can adopt a value as follows: $RNTP_{threshold} \in \{-\infty, -11, -10, -9, -8, -7, -6, -5, -4, -3, -2, -1, 0, +1, +2, +3\}$ dB. However, it is expected that for some virtual carrier power boosting implementations in accordance with embodiments of the invention significantly higher transmission powers may be desired, for example up to 20 dB. Thus, correspondingly higher values may be defined for the proposed power boost RNTP threshold information element in accordance with some embodiments of the invention. In some examples a wireless telecommunications system may be configured such that power boosting is simply on or off with no variation in power. In this case, there may be a reduced number of potential values for power boost RNTP threshold. For example only three values might be available with a value +X dB corresponding with power boosting by an amount X (where X will depend on how much power boosting the system allows, for example X might be 20), a value of zero dB corresponding with no power boosting applied on the virtual carrier, and a value of $-\infty$ being used if there are no virtual carrier transmissions for the upcoming period.

In some example embodiments there may be no need for a specific RNTP threshold information element to be communicated between base stations, for example where power boosting is either on or off and applied at a predefined level. In this case the inter-base station to locations may simply comprise a bit string in which the different bits related to different frequencies that may be adopted for virtual carrier transmissions, and a value of zero or one is selected to indicate whether or not transmissions on the corresponding frequencies are to be power boosted or not. In some examples such a bit string may follow the conventional RNTP approach of associating different bits with different resource blocks. However, in many cases it may be the case that power boosting is to be applied it will be applied to all the resource block comprising a virtual carrier. Thus, in some examples where there might be a predefined number of virtual carriers, the bit string may simply comprise a single bit for each virtual carrier. For example if a wireless telecommunications system supports a fixed number of four virtual carriers with the respective virtual carriers being identified by corresponding index values 0, 1, 2, 3, the bit string may simply comprise four bits. A bit value of 0 or 1 may thus be used to indicate whether transmissions from the base station on the corresponding virtual carrier are to support power boosted operation in the upcoming period. For example, a power boost RNTP message comprising the bit string [0010] may be taken to comprise an indication that the base station intends to apply power boosting to the third virtual carrier supported in the wireless telecommunications system.

It will be appreciated similar bit string approach can be taken to identify time periods in which a base station intends to adopt power boosted operation in cases where power boosting may be applied on a per subframe basis over a coordination period. For example, if a coordination period comprises 40 subframes, a 40 bit message may be sent by a base station to neighbouring base stations to indicate which of those 40 subframes are intended to be used for power boosted by the base station sending the message.

It will be appreciated that various modifications can be made to the embodiments described above without departing from the scope of the present invention as defined in the appended claims.

For example, in some implementations a base station may be configured to always apply power boosting for all its virtual carrier transmissions. In this case an operating step corresponding to step S2 in FIG. 18 would simply rely on the base station determining whether there are any virtual carrier transmissions to be made at all for an upcoming period, regardless of the destination terminal device, i.e. regardless of whether it is in a poor coverage location require power boosting for reliable transmissions.

In some implementations base stations may coordinate in accordance with the principles described above to exchange information regarding the transmission resources on which they intend to adopt virtual carrier transmissions, for example in terms of time and/or frequency, without specifically indicating whether or not those transmissions will be power boosted. The respective base stations may then select their own transmission resources to be used for virtual carrier transmissions in a manner which avoids overlap with neighbouring base stations in accordance with the principles described above. Thus, in accordance with this approach the respective base stations are configured to help avoid the situation in which neighbouring base stations are employing the same resources for their virtual carrier transmissions. The individual base stations may then be free to apply power boosting as desired on the virtual carrier on the understanding there will be no neighbouring base stations using the same virtual carrier resources. That is to say, the characteristics regarding a base station's upcoming virtual carrier transmissions that are communicated to neighbouring base stations in accordance with embodiments of the invention may simply comprise an indication of the transmission resources to be used by the base station to support virtual carrier transmissions without any indication of whether or not power boosting is to be adopted.

Furthermore, although embodiments of the invention have been described with reference to an LTE mobile radio network, it will be appreciated that the present invention can be applied to other forms of network such as GSM, 3G/UMTS, CDMA2000, etc. The term MTC terminal as used herein can be replaced with user equipment (UE), mobile communications device, terminal device etc. Furthermore, although the term base station has been used interchangeably with eNodeB it should be understood that there is no difference in functionality between these network entities.

The above-described implementations of a power-boosted virtual carrier in wireless telecommunications systems according to embodiments of the invention provide schemes for improved communication reliability on downlink through transmission power budget concentration within a relatively narrow-band virtual carrier within a host carrier spanning a wider system bandwidth. It will be appreciated that in some circumstances it may be necessary for a terminal device requiring power boosted virtual carrier transmissions to reliably receive information from a base station may need to take steps to improve reliability of its uplink transmissions. There are various ways this can be done. For example, a brute force approach may be to simply provide the terminal device with a more powerful transmitter by separate power amplifier to overcome the additional path losses associated with its transmissions. For example, a terminal device in a basement having an additional attenuation of n dB as compared to a nearby terminal device outside the basement may be provided with a transmitter configured to transmit with sufficient power to overcome the additional n dB loss. Other techniques might involve adopting established approaches for extending uplink coverage in wireless telecommunications systems. For example, one approach in respect of RACH transmissions would be for a base station to indicate to a terminal device identified as one potentially requiring power boosted transmissions that it should adopt a large repetition RACH format, such as the defined preamble formats 3 or 4 in LTE-based wireless communications systems. An approach in respect of PUSCH (uplink data channel) communications might be to adopt known techniques such as TTI bundling to increase the reliability of success for uplink transmission from the terminal device to the base station.

Thus, A method of operating a base station in a wireless telecommunications system has been described. Downlink communications from the base station to terminal devices are made using a plurality of OFDM sub-carriers spanning a system frequency bandwidth. The base station supports communications with a first type of terminal device on a host carrier using OFDM sub-carriers distributed across the system frequency bandwidth and supports communications with a second type of terminal device on a restricted bandwidth carrier using OFDM sub-carriers distributed across a restricted frequency bandwidth which is smaller than and within the system frequency bandwidth. The base station receives from a further base station of the wireless telecommunications system an indication of a transmission characteristic to be used by the further base station for transmissions to the second type of terminal device using a reduced bandwidth carrier associated with the further base station. The base station selects a transmission characteristic for its own transmissions to be made to the second type of terminal device using the restricted bandwidth carrier in a manner that takes account of the indication of the transmission characteristic received from the further base station. The base station then conveys an indication of the transmission characteristic from the base station to at least one other base station of the wireless telecommunications system. Thus, the respective base stations exchange information regarding their restricted bandwidth carrier transmissions to help them coordinate their respective transmissions with a view to reducing intercell interference.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] ETSI TS 122 368 V10.530 (2011-07)/3GPP TS 22.368 version 10.5.0 (Release 10)
[2] UK patent application GB 1101970.0
[3] UK patent application GB 1101981.7
[4] UK patent application GB 1101966.8
[5] UK patent application GB 1101983.3
[6] UK patent application GB 1101853.8
[7] UK patent application GB 1101982.5
[8] UK patent application GB 1101980.9
[9] UK patent application GB 1101972.6
[10] UK patent application GB 1121767.6
[11] UK patent application GB 1121766.8
[12] Holma H. and Toskala A, "LTE for UMTS OFDMA and SC-FDMA based radio access", John Wiley and Sons, 2009
[13] Nomor Research GmbH—"Heterogeneous LTE Networks and Intercell Interference Coordination", Pauli et al.
[14] ZTE Corporation—"Enhanced ICIC for LTE-A HetNet", Xiang.
[15] ETSI TS 136 420 V11.0.0 (2012-10)/3GPP TS 36.420 version 11.0.0 (Release 11)
[16] 3GPP TS 36.423 version 11.2.0 (Release 11)

The invention claimed is:

1. A method of operating a base station in a wireless telecommunications system in which downlink communications from the base station to terminal devices are made using a plurality of Orthogonal Frequency Division Multiplex (OFDM) sub-carriers spanning a system frequency bandwidth, and wherein the base station supports communications with a first type of terminal device on a host carrier using OFDM sub-carriers distributed across the system frequency bandwidth and supports communications with a second type of terminal device on a restricted bandwidth carrier using OFDM sub-carriers distributed across a restricted frequency bandwidth, wherein the restricted frequency bandwidth is smaller than and within the system frequency bandwidth, and wherein the method comprises:
selecting a transmission characteristic for transmissions to be made by the base station to the second type of terminal device using the restricted bandwidth carrier; and
conveying an indication of the transmission characteristic from the base station to at least one other base station of the wireless telecommunications system, and
repeating a paging information message to the second type of terminal device over more than one subframe,
wherein the indication of the transmission characteristic comprises an indication that transmissions are to be made by the base station to the second type of terminal device using the restricted bandwidth carrier with a maximum transmission power threshold which is greater than a maximum transmission power threshold for contemporaneous transmissions to be made by the base station to the first type of terminal device using the host carrier.

2. The method according to claim 1, wherein each repetition of the paging information message is made with an increased power.

3. A base station in a wireless telecommunications system in which downlink communications from the base station to terminal devices are made using a plurality of Orthogonal Frequency Division Multiplex (OFDM) sub-carriers spanning a system frequency bandwidth, and wherein the base station supports communications with a first type of terminal device on a host carrier using OFDM sub-carriers distributed across the system frequency bandwidth and supports communications with a second type of terminal device on a restricted bandwidth carrier using OFDM sub-carriers distributed across a restricted frequency bandwidth, wherein the restricted frequency bandwidth is smaller than and within the system frequency bandwidth, the base station comprising:
an antenna; and
circuitry coupled to the antenna and configured to
select a transmission characteristic for transmissions to be made by the base station to the second type of terminal device using the restricted bandwidth carrier; and
convey an indication of the transmission characteristic to at least one other base station of the wireless telecommunications system, and
repeat a paging information message to the second type of terminal device over more than one subframe,
wherein the indication of the transmission characteristic comprises an indication that transmissions are to be made by the base station to the second type of terminal device using the restricted bandwidth carrier with a maximum transmission power threshold which is greater than a maximum transmission power threshold for contemporaneous transmissions to be made by the base station to the first type of terminal device using the host carrier.

4. The base station according to claim 3, wherein
the circuitry is further configured to select another transmission characteristic which includes frequency and/or time resources on which transmissions are to be made by the base station to the second type of terminal device using the restricted bandwidth carrier.

5. The base station according to claim 3, wherein the indication further comprises an identifier for a range of frequencies for the restricted bandwidth carrier selected from a set of potential ranges of frequencies for restricted bandwidth carriers that the base station is able to support.

6. The base station according to claim 3, wherein the indication further comprises an indication of physical resource blocks to be used by the base station for transmitting the restricted bandwidth carrier.

7. The base station according to claim 3, wherein the wireless telecommunications system uses a radio frame structure comprising subframes, and wherein
the indication further comprises an indication of one or more subframes to be used by the base station for transmissions to the second type of terminal device using the restricted bandwidth carrier.

8. The base station according to claim 3, wherein the circuitry is further configured to receive from a further base station of the wireless telecommunications system an indication of a transmission characteristic to be used by the further base station for transmissions to the second type of terminal device using a reduced bandwidth carrier, and to take account of the indication of the transmission characteristic received from the further base station when selecting the transmission characteristic for transmissions to be made by the base station using the restricted bandwidth carrier.

9. The base station according to claim 8, wherein the indication of the transmission characteristic received from the further base station comprises an indication of frequency and/or time resources on which transmissions are to be made by the further base station to the second type of terminal device using a restricted bandwidth carrier associated with the further base station, and wherein the circuitry is configured to select a transmission characteristic for transmissions to be made by the base station to the second type of terminal device using a restricted bandwidth carrier of the base station by selecting frequency and/or time resources to be used for the restricted bandwidth carrier of the base station which are different from frequency and/or time resources comprising the indication of the transmission characteristic received from the further base station.

10. The base station according to claim 9, wherein the further base station from which an indication of frequency and/or time resources on which transmissions are to be made by the further base station is received is one of the at least one other base station to which the base station conveys its own indication of a transmission characteristic.

11. The base station according to claim 3, wherein the base station is configured such that the indication of the transmission characteristic is conveyed from the base station to the at least one other base station of the wireless telecommunications system over a point-to-point logical interface between the base station and respective ones of the at least one other base station.

12. The base station according to claim 3, wherein the base station is configured such that the indication of the transmission characteristic is conveyed from the base station to the at least one other base station of the wireless telecommunications system over an X2 interface of the wireless telecommunications system.

13. The base station according to claim 12, wherein the base station is configured such that the indication of the transmission characteristic is conveyed to the at least one other base station in an information element defined for the X2 interface.

14. The base station according to claim 3, wherein the first type of terminal device and the second type of terminal device are types of terminal device having different operating capabilities.

15. The base station according to claim 3, wherein the circuitry is configured to repeat paging to the second type of terminal device over more than one sub-frame for additional gain.

* * * * *